United States Patent
Wu et al.

(10) Patent No.: US 12,221,125 B2
(45) Date of Patent: Feb. 11, 2025

(54) REMINDING METHOD AND APPARATUS IN ASSISTED DRIVING, REMINDING METHOD AND APPARATUS IN MAP-ASSISTED DRIVING, AND MAP

(71) Applicant: Huawei Technologies Co., Ltd., Guangdong (CN)

(72) Inventors: Jinfei Wu, Nanjing (CN); Derun Su, Nanjing (CN); Guicheng Zhang, Nanjing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 71 days.

(21) Appl. No.: 18/123,191

(22) Filed: Mar. 17, 2023

(65) Prior Publication Data

US 2023/0227057 A1 Jul. 20, 2023

Related U.S. Application Data

(63) Continuation of application No. PCT/CN2021/116524, filed on Sep. 3, 2021.

(30) Foreign Application Priority Data

Sep. 21, 2020 (CN) .......................... 202010997081.2

(51) Int. Cl.
*B60W 50/14* (2020.01)
*B60Q 1/34* (2006.01)

(52) U.S. Cl.
CPC .............. *B60W 50/14* (2013.01); *B60Q 1/34* (2013.01); *B60W 2050/146* (2013.01);

(Continued)

(58) Field of Classification Search
CPC ............ B60W 50/14; B60W 2552/00; B60W 2556/45; B60W 2555/60; B60W 2050/146; B60Q 1/34

See application file for complete search history.

(56) References Cited

U.S. PATENT DOCUMENTS 11,538,341 B2 * 12/2022 Franke ............. G08G 1/096716
11,735,037 B2 *  8/2023 Matus .................. G08G 1/0967
                                                                701/117

(Continued)

FOREIGN PATENT DOCUMENTS

EP        2413301 A1 *  2/2012 ............. G01C 21/32
JP     2005174059 A *  6/2005

(Continued)

*Primary Examiner* — Chico A Foxx
(74) *Attorney, Agent, or Firm* — WOMBLE BOND DICKINSON (US) LLP

(57) ABSTRACT

A method, system and medium for assisted driving of a vehicle are disclosed. The method comprises predicting a target intersection based on map information, a positioning location of the vehicle, and a motion status of the vehicle, where the target intersection is an intersection that the vehicle is to first pass in the future; determining a distance between the vehicle and the target intersection based on the map information and the positioning location of the vehicle; collect a turn light status of the vehicle; and when the distance between the vehicle and the target intersection is less than a first threshold, generating prompt information based on the turn light status of the vehicle and a first turning rule of a first lane in which the vehicle is located at the target intersection, where the prompt information prompts that the turn light status does not conform to the first turning rule.

20 Claims, 16 Drawing Sheets

(52) U.S. Cl.
CPC ..... *B60W 2552/00* (2020.02); *B60W 2555/60* (2020.02); *B60W 2556/45* (2020.02)

(56) References Cited

U.S. PATENT DOCUMENTS

| | | | |
|---|---|---|---|
| 11,871,313 B2 * | 1/2024 | Matus | G01S 19/42 |
| 2003/0130788 A1 * | 7/2003 | Akashi | G01C 21/3644 |
| | | | 701/437 |
| 2007/0171095 A1 * | 7/2007 | Mochizuki | G08G 1/0104 |
| | | | 340/995.13 |
| 2012/0136570 A1 * | 5/2012 | Yamashita | G08G 1/0129 |
| | | | 701/437 |
| 2016/0232785 A1 * | 8/2016 | Wang | G08G 1/0129 |
| 2021/0192560 A1 * | 6/2021 | Wang | G06Q 50/01 |
| 2023/0303115 A1 * | 9/2023 | Tominaga | G08G 1/16 |

FOREIGN PATENT DOCUMENTS

| | | | |
|---|---|---|---|
| JP | 2010145187 A * | 7/2010 | |
| JP | 4881757 B2 * | 2/2012 | |

\* cited by examiner

REMINDING METHOD AND APPARATUS IN ASSISTED DRIVING, REMINDING METHOD AND APPARATUS IN MAP-ASSISTED DRIVING, AND MAP

CROSS-REFERENCE TO RELATED APPLICATIONS

This application is a continuation of International Application No. PCT/CN2021/116524, filed on Sep. 3, 2021, which claims priority to Chinese Patent Application No. 202010997081.2, filed on Sep. 21, 2020. The disclosures of the aforementioned applications are hereby incorporated by reference in their entireties.

TECHNICAL FIELD

This application relates to the field of connected vehicles, and in particular, to a reminding method in assisted driving and apparatus, a reminding method in map-assisted driving and apparatus, and a map.

BACKGROUND

In a typical scenario in which a weather condition is severe or a turning sign on a lane ground does not conform to a driving habit, a driver may violate a traffic rule due to misjudgment of a lane, which may even cause a traffic accident in serious cases.

In a conventional technology, a driving suggestion may be provided by using map navigation software when a vehicle is running. However, the driver may judge the driving suggestion based on a current actual road condition or driving experience of the driver, and may not select a driving route planned by the navigation software or may not use navigation. In addition, navigation performed by using the map navigation software depends on accuracy of a map in the navigation software. For a remote area or a newly developed road section, the map in the navigation software may not be accurate. As a result, an incorrect driving suggestion may be provided.

SUMMARY

This application provides a reminding method in assisted driving and apparatus, a reminding method in map-assisted driving and apparatus, and a map, to improve vehicle driving experience and driving safety.

According to a first aspect, this application provides a reminding method in assisted driving. The method may be performed by an reminding apparatus in assisted driving. The reminding apparatus in assisted driving may be a communication device or a communication apparatus that can support the communication device in implementing a function in the method, for example, a chip system. For example, the reminding apparatus in assisted driving may be a server, a terminal device, a vehicle, or a vehicle-mounted apparatus. The method includes: predicting a target intersection based on map information, a positioning location of a vehicle, and a motion status of the vehicle, where the target intersection is an intersection that the vehicle is to first pass in the future; determining a distance between the vehicle and the target intersection based on the map information and the positioning location of the vehicle; and when the distance between the vehicle and the target intersection is less than a first threshold, generating prompt information based on a turn light status of the vehicle and a first turning rule of a first lane in which the vehicle is located at the target intersection, where the prompt information prompts that the turn light status does not conform to the first turning rule.

Based on the foregoing solution, an intersection that a current vehicle is to pass, that is, the target intersection, and the distance between the vehicle and the target intersection may be predicted by using the map information, the positioning location of the vehicle, and the motion status of the vehicle. When it is determined that the distance between the vehicle and the target intersection is less than the first threshold, the first turning rule of the first lane in which the vehicle is located may be determined based on the map information and the positioning location of the vehicle. Therefore, it may be determined, by comparing the turn light status of the vehicle with the first turning rule, that a current driving status of the vehicle does not conform to the turning rule of the lane, the prompt information needs to be sent to a user, to warn a driver to adjust the driving status of the vehicle in a timely manner. Therefore, when a weather condition is severe or a turning sign on a lane ground does not conform to a driving habit, the driver may avoid violating a traffic rule due to misjudgment of the lane. This improves vehicle driving experience and driving safety.

Considering different scenarios in a driving process of the driver, the prompt information may also be generated in a plurality of scenarios. The following uses a manner 1 and a manner 2 as examples.

Manner 1: When the distance between the vehicle and the target intersection is less than the first threshold and greater than a second threshold, the prompt information is further used to prompt the vehicle to change from the first lane to a second lane, and the turn light status meets a second turning rule of a second lane at the target intersection, where the second threshold is less than the first threshold.

According to the foregoing method, when the distance between the vehicle and the target intersection is less than the first threshold and greater than the second threshold, the vehicle may be at a dashed line location, and the driver may be prompted, based on the turn light status of the vehicle, to drive in a lane that is consistent with the turn light status. For example, enough time is reserved for changing from the first lane to the second lane, so that the driver may have enough time to determine whether to change the lane based on the prompt information. This improves driving experience of the driver.

Manner 2: When the distance between the vehicle and the target intersection is less than the second threshold, the prompt information is further used to prompt that the vehicle passes the target intersection from the first lane based on the first turning rule, where the second threshold is less than the first threshold.

According to the foregoing method, for example, when the distance between the vehicle and the target intersection is less than the second threshold, the vehicle may drive in a solid line area at which lane change cannot be performed. In this case, the driver may be prompted, based on the turn light status of the vehicle, that the lane change cannot be performed in this case, and may be prompted to drive in the target intersection from the first lane based on the first turning rule of the first lane. Therefore, when the driver drives to the solid line area and finds that the first turning rule of the first lane is inconsistent with a status that the driver wants to drive, the driver may resolve problems that are of safety hazards and violation of the traffic rule and that are produced because the driver turns or changes the lane in emergency. This improves driving safety of the driver.

Certainly, the prompt information may alternatively be generated based on another scenario in which the lane change may not be performed, to prompt the driver to pass the target intersection from the first lane based on the first turning rule. This is not limited herein.

In an embodiment, the first threshold is related to at least one of a solid line length of the first lane, a running speed of the vehicle, or a traffic congestion degree near the positioning location of the vehicle.

In an embodiment, the second threshold is related to at least one of the solid line length of the first lane, the running speed of the vehicle, or the traffic congestion degree near the positioning location of the vehicle.

According to the foregoing method, the first threshold or the second threshold may be determined based on a plurality of factors, for example, the solid line length of the first lane, the running speed of the vehicle, or the traffic congestion degree near the positioning location of the vehicle. This helps improve accuracy of time for generating the prompt information, to adapt to a plurality of different scenarios.

In an embodiment, the target intersection may be an intersection with a bifurcation, a combined intersection, and an intersection closest to the vehicle.

According to the foregoing method, generation of the prompt information may be triggered only at the intersection with a bifurcation or the combined intersection, to reduce power consumption of the reminding apparatus in assisted driving.

In an embodiment, the target intersection includes an entrance or an exit of an overpass. The prompt information further indicates that an intersection ahead includes a lane of an entrance or an exit of an overpass.

According to the foregoing method, when the target intersection is a special intersection, the driver may be prompted that a lane ahead is a lane of an entrance or an exit of an overpass, and the prompt information is adaptively generated. This helps the driver plan a driving route in advance, and therefore, when the weather condition is severe or the turning sign on a lane ground does not conform to the driving habit, the driver may resolve problems that are of reduction of the driving experience and the violation of the traffic rule and that are produced because the driver is unfamiliar with lane changes.

In an embodiment, the distance between the vehicle and the target intersection is determined based on positioning information of a GNSS of the vehicle and a location of a stop line at an intersection on a map.

According to the foregoing method, the distance between the vehicle and the target intersection may be accurately and quickly determined and easy to implement. This helps improve prompt information generation efficiency.

In an embodiment, positioning data is collected by using a laser radar. The lane in which the vehicle is located may be determined by matching the positioning data collected by the laser radar with information of a lane on a high definition map.

According to the foregoing method, the lane in which the vehicle is located may be accurately obtained, this helps the reminding apparatus in assisted driving generate the prompt information based on the turn light status of the vehicle and the first turning rule of the first lane in which the vehicle is located at the target intersection, to improve accuracy of the prompt information.

In an embodiment, the method further includes: reporting first information to a server; or storing the first information. The first information is generated based on the prompt information, and records the first lane at the target intersection as a turning violation-prone lane.

According to the foregoing method, after the reminding apparatus in assisted driving generates the prompt information, the reminding apparatus in assisted driving generates the first information to record the first lane at the target intersection as a turning violation-prone lane, and stores the first information, or reports the first information to the server, so as to provide, based on the first information generated by the reminding apparatus in assisted driving, corresponding reminder information for another vehicle driving to the intersection, provide a query for a person such as a driver or an owner of the current vehicle, or provide auxiliary information for subsequent driving. This improves the driving experience.

In an embodiment, the first information includes at least one of a first identifier of the vehicle or first identity information of a current driver of the vehicle.

According to the foregoing method, information about the vehicle or the driver may be carried in the first information, to provide more possibilities for a subsequent application of the first information.

According to a second aspect, this application provides a map. In a possible scenario, the map may be generated by using a map generation apparatus. The map generation apparatus may be a communication device or a communication apparatus that can support the communication device in implementing a function in the method, for example, a chip system. For example, the map generation apparatus may be a map server, a terminal device, a vehicle, or a vehicle-mounted apparatus. In another possible scenario, the map may be used or stored by using an apparatus that uses the map. The apparatus may be a communication device or a communication apparatus that can support the communication device in implementing a function in the method, for example, a chip system. For example, the apparatus may be a map server, a terminal device, a vehicle, or a vehicle-mounted apparatus.

The map includes the first information according to any embodiment of the first aspect.

According to the foregoing method, the map includes the first information, so that the apparatus that uses the map may inquire the first information, and more reference information may be provided for subsequent navigation or query by using the map. Therefore, a driver, especially a driver who is unfamiliar with a route has an expectation of a turning violation-prone lane, and this improves driving experience of the driver.

According to a third aspect, this application provides a map. In a possible scenario, the map may be generated by using a map generation apparatus. The map generation apparatus may be a communication device or a communication apparatus that can support the communication device in implementing a function in the method, for example, a chip system. For example, the map generation apparatus may be a map server, a terminal device, a vehicle, or a vehicle-mounted apparatus. In another possible scenario, the map may be used or stored by using an apparatus that uses the map. The apparatus may be a communication device or a communication apparatus that can support the communication device in implementing a function in the method, for example, a chip system. For example, the apparatus may be a map server, a terminal device, a vehicle, or a vehicle-mounted apparatus.

The map includes first information, and the first information records at least one lane of at least one target intersection as a turning violation-prone lane. The first information may be information customized for a specific user, or may be common information obtained by processing based on big data of numerous users.

In an embodiment, the first information is generated based on prompt information, and the prompt information prompts that a turn light status of a vehicle does not conform to a turning rule of a lane in which the vehicle is located. When the first information is the information customized for a specific user, the first information is generated only based on the prompt information for a specific user, without reference to prompt information for another user.

According to the foregoing method, first information including a first lane at a target intersection on the map is a turning violation-prone lane, so that the apparatus that uses the map can inquire the first information, and more reference information may be provided for subsequent navigation or query by using the map. Therefore, a driver, especially a driver who is unfamiliar with a route has an expectation of the turning violation-prone lane, and this improves driving experience of the driver.

In an embodiment, the first information includes at least one of a first identifier of the vehicle or first identity information of a current driver of the vehicle.

According to the foregoing method, information about the vehicle or the driver may be carried in the first information, to provide more possibilities for an application of the map. This improves applicability of the map and experience of user using the map.

In an embodiment, the first information may be information reported by the vehicle to the server, or the first information may be information stored by the vehicle.

According to the foregoing method, after an reminding apparatus in assisted driving generates the prompt information, the reminding apparatus in assisted driving generates the first information, stores the first information, or reports the first information to the server, to provide, based on the map including the first information, corresponding reminder information for another vehicle driving to the intersection to use the map, provide a query for a person such as a driver or an owner of a current vehicle by using the map, or provide auxiliary information for subsequent driving. This improves the driving experience.

In an embodiment, the prompt information is prompt information generated based on the turn light status of the vehicle and the first turning rule of a first lane in which the vehicle is located at the target intersection when a distance between the vehicle and the target intersection is less than a first threshold. The target intersection is a target intersection predicted based on map information, a positioning location of a vehicle, and a motion status of the vehicle. The target intersection is an intersection that the vehicle is to first pass in the future. The distance between the vehicle and the target intersection is determined based on the map information and the positioning location of the vehicle.

According to the foregoing method, the prompt information included in the first information may be generated by the reminding apparatus in assisted driving. The reminding apparatus in assisted driving may be a communication device or a communication apparatus that can support the communication device in implementing a function in the method, for example, a chip system. For example, the reminding apparatus in assisted driving may be a server, a terminal device, a vehicle, or a vehicle-mounted apparatus. Specifically, an intersection that a current vehicle is to pass, that is, the target intersection, and the distance between the vehicle and the target intersection may be predicted by using the map information, the positioning location of the vehicle, and the motion status of the vehicle. When it is determined that the distance between the vehicle and the target intersection is less than the first threshold, the first turning rule of the first lane in which the vehicle is located may be determined based on the map information and the positioning location of the vehicle. Therefore, it may be determined, by comparing the turn light status of the vehicle with the first turning rule, that a current driving status of the vehicle does not conform to the turning rule of the lane, the prompt information needs to be sent to the user, to warn a driver to adjust the driving status of the vehicle in a timely manner. Therefore, when a weather condition is severe or a turning sign on a lane ground does not conform to a driving habit, the driver may avoid violating a traffic rule due to misjudgment of the lane. This improves vehicle driving experience and driving safety.

In an embodiment, when the distance between the vehicle and the target intersection is less than the first threshold and greater than a second threshold, the prompt information is further used to prompt the vehicle to change from the first lane to a second lane, and the turn light status meets a second turning rule of a second lane at the target intersection, where the second threshold is less than the first threshold.

According to the foregoing method, when the distance between the vehicle and the target intersection is less than the first threshold and greater than the second threshold, the vehicle may be at a dashed line location, and the driver may be prompted, based on the turn light status of the vehicle, to drive in a lane that is consistent with the turn light status. For example, enough time is reserved for changing from the first lane to the second lane, so that the driver may have enough time to determine whether to change the lane based on the prompt information. This improves the driving experience of the driver.

In an embodiment, when the distance between the vehicle and the target intersection is less than the second threshold, the prompt information is further used to prompt that the vehicle passes the target intersection from the first lane based on the first turning rule, where the second threshold is less than the first threshold.

According to the foregoing method, for example, when the distance between the vehicle and the target intersection is less than the second threshold, the vehicle may drive in a solid line area at which lane change cannot be performed. In this case, the driver may be prompted, based on the turn light status of the vehicle, that the lane change cannot be performed in this case, and may be prompted to drive in the target intersection from the first lane based on the first turning rule of the first lane. Therefore, when the driver drives to the solid line area and finds that the first turning rule of the first lane is inconsistent with a status that the driver wants to drive, the driver may resolve problems that are of safety hazards and violation of the traffic rule and that are produced because the driver turns or changes the lane in emergency. This improves driving safety of the driver. Certainly, the prompt information may alternatively be generated based on another scenario in which the lane change may not be performed, to prompt the driver to pass the target intersection from the first lane based on the first turning rule. This is not limited herein.

In an embodiment, the first threshold is related to at least one of a solid line length of the first lane, a running speed of the vehicle, or a traffic congestion degree near the positioning location of the vehicle.

In an embodiment, the second threshold is related to at least one of the solid line length of the first lane, the running speed of the vehicle, or the traffic congestion degree near the positioning location of the vehicle.

According to the foregoing method, the first threshold or the second threshold may be determined based on a plurality of factors, for example, the solid line length of the first lane, the running speed of the vehicle, or the traffic congestion degree near the positioning location of the vehicle. This helps improve accuracy of time for generating the prompt information, to adapt to a plurality of different scenarios.

According to a fourth aspect, this application provides a reminding method in map-assisted driving. The method may be performed by a reminding apparatus in map-assisted driving. The reminding apparatus in map-assisted driving may be a communication device or a communication apparatus that can support the communication device in implementing a function in the method, for example, a chip system. For example, the reminding apparatus in assisted driving may be a server, a terminal device, a vehicle, or a vehicle-mounted apparatus. The method includes: determining, based on a driving path planning result, that a vehicle is to pass a target intersection in a first direction; determining, based on any possible map according to the second aspect or the third aspect, a first lane in which the vehicle passes the target intersection in the first direction, where the first lane is one of at least one turning violation-prone lane recorded in first information on the map; and generating reminder information, where the reminder information reminds a driver that a first lane in which the vehicle is to pass in the future based on a planned driving route is a turning violation-prone lane.

According to the foregoing method, after it is determined, based on the driving path planning result, that the vehicle is to pass the target intersection in the first direction, it is determined, based on any possible map in the second aspect or the third aspect, that the vehicle is to pass the first lane or may pass the first lane. In this case, the reminder information may be generated, to warn the driver that the first lane in which the vehicle is to pass in the future is a turning violation-prone lane, so that the driver may avoid, based on the reminder information, the first lane, or drive based on a turning rule of the lane when driving in the first lane, without reminding the driver when a violation occurs. This improves applicability of the reminder, and improves driving experience of the driver.

In an embodiment, the first information further includes identity information of a historical user that has a turning violation risk when the vehicle passes the target intersection from the first lane, and the identity information of the historical user includes at least one of a first identifier or first identity information. The method further includes: obtaining identity information of a current user, where the identity information of the current user includes at least one of an identifier of the vehicle or identity information of a current driver of the vehicle. The generating reminder information includes: generating the reminder information based on a result of consistency comparison between the identity information of the current user and the identity information of the historical user.

According to the foregoing method, after different drivers drive to a target intersection having the first information, different reminder information may be generated for the different drivers based on the identity information of the historical user, so that the reminder information may be personalized. This improves an orientation capability of the reminder information, and improves accuracy of a map-assisted reminder.

According to a fifth aspect, this application provides a reminding method in map-assisted driving. The method may be performed by a reminding apparatus in map-assisted driving. The reminding apparatus in map-assisted driving may be a communication device or a communication apparatus that can support the communication device in implementing a function in the method, for example, a chip system. For example, the reminding apparatus in assisted driving may be a server, a terminal device, a vehicle, or a vehicle-mounted apparatus. The method includes: determining, based on a driving path planning result, that a vehicle is to pass a target intersection in a first direction; determining, based on a map, a first lane in which the vehicle passes the target intersection in the first direction, where the first lane is one of at least one turning violation-prone lane recorded in first information on the map, the map includes first information, the first information is generated based on prompt information, and records the first lane at the target intersection as a turning violation-prone lane, and the prompt information prompts that a turn light status of the vehicle does not conform to a first turning rule of a first lane in which the vehicle is located; and generating reminder information, where the reminder information reminds a driver that a first lane in which the vehicle is to pass in the future based on a planned driving route is a turning violation-prone lane.

According to the foregoing method, after it is determined, based on the driving path planning result, that the vehicle is to pass the target intersection in the first direction, the reminding apparatus in map-assisted driving may inquire the first information based on a map including the first information that the first lane of the target intersection is a turning violation-prone lane, and determines that the vehicle is to pass the first lane or may pass the first lane. In this case, the reminder information may be generated, to warn a driver that the first lane in which the vehicle is to pass in the future is a turning violation-prone lane, so that the driver may avoid, based on the reminder information, the first lane, or drive based on a turning rule of the lane when driving in the first lane, without reminding the driver when a violation occurs. This improves applicability of the reminder. Therefore, a driver, especially a driver who is unfamiliar with a route has an expectation of the turning violation-prone lane, and this improves driving experience of the driver.

In an embodiment, the first information includes at least one of a first identifier of the vehicle or first identity information of a current driver of the vehicle.

According to the foregoing method, information about the vehicle or the driver may be carried in the first information, to provide more possibilities for an application of the map. This improves applicability of the map and experience of user using the map.

In an embodiment, the first information may be information reported by the vehicle to the server, or the first information may be information stored by the vehicle.

According to the foregoing method, after an reminding apparatus in assisted driving generates the prompt information, the reminding apparatus in assisted driving generates the first information, stores the first information, or reports the first information to the server, to provide, based on the map including the first information, corresponding reminder information for another vehicle driving to the intersection to use the map, provide a query for a person such as a driver or an owner of a current vehicle by using the map, or provide auxiliary information for subsequent driving. This improves the driving experience.

In an embodiment, when a distance between the vehicle and the target intersection is less than the first threshold, the prompt information is generated based on the turn light status of the vehicle and a first turning rule of the target intersection. The target intersection is a target intersection predicted based on map information, a positioning location of a vehicle, and a motion status of the vehicle. The target intersection is an intersection that the vehicle is to first pass in the future. The distance between the vehicle and the target intersection is determined based on the map information and the positioning location of the vehicle.

In an embodiment, when the distance between the vehicle and the target intersection is less than a first threshold and greater than a second threshold, the prompt information is further used to prompt the vehicle to change from the first lane to a second lane, and the turn light status meets a second turning rule of the second lane at the target intersection, where the second threshold is less than the first threshold.

In an embodiment, when the distance between the vehicle and the target intersection is less than the second threshold, the prompt information is further used to prompt that the vehicle passes the target intersection from the first lane based on the first turning rule, where the second threshold is less than the first threshold.

In an embodiment, the first threshold is related to at least one of a solid line length of the first lane, a running speed of the vehicle, or a traffic congestion degree near the positioning location of the vehicle.

In an embodiment, the second threshold is related to at least one of the solid line length of the first lane, the running speed of the vehicle, or the traffic congestion degree near the positioning location of the vehicle.

For technical effects of embodiments of the fifth aspect, refer to descriptions of technical effects of corresponding embodiments of the third aspect.

According to a sixth aspect, this application provides an reminding apparatus in assisted driving. The reminding apparatus in assisted driving may be a communication device or a communication apparatus that can support the communication device in implementing a function in the method, for example, a chip system. For example, the reminding apparatus in assisted driving may be a server, a terminal device, a vehicle, or a vehicle-mounted apparatus. The apparatus includes:

a prediction module, configured to predict a target intersection based on map information, a positioning location of a vehicle, and a motion status of the vehicle, where the target intersection is an intersection that the vehicle is to first pass in the future;

a distance determining module, configured to determine a distance between the vehicle and the target intersection based on the map information and the positioning location of the vehicle; and a prompt information generation module, configured to: when the distance determining module determines that the distance between the vehicle and the target intersection is less than a first threshold, generate prompt information based on a turn light status of the vehicle and a first turning rule of a first lane in which the vehicle is located at the target intersection, where the prompt information prompts that the turn light status does not conform to the first turning rule.

In an embodiment, when the distance determining module determines that the distance between the vehicle and the target intersection is less than the first threshold and greater than a second threshold, the prompt information is further used to prompt the vehicle to change from the first lane to a second lane, and the turn light status meets a second turning rule of the second lane at the target intersection, where the second threshold is less than the first threshold.

In an embodiment, when the distance determining module determines that the distance between the vehicle and the target intersection is less than the second threshold, the prompt information is further used to prompt that the vehicle passes the target intersection from the first lane based on the first turning rule, where the second threshold is less than the first threshold.

In an embodiment, the first threshold is related to at least one of a solid line length of the first lane, a running speed of the vehicle, or a traffic congestion degree near the positioning location of the vehicle.

In an embodiment, the second threshold is related to at least one of the solid line length of the first lane, the running speed of the vehicle, or the traffic congestion degree near the positioning location of the vehicle.

In an embodiment, the apparatus further includes a sending module, where the sending module is configured to report first information to a server.

Alternatively, the apparatus further includes a storage module, where the storage module is configured to store the first information.

The first information is generated based on the prompt information, and records the first lane at the target intersection as a turning violation-prone lane.

In an embodiment, the first information includes at least one of a first identifier of the vehicle or first identity information of a current driver of the vehicle.

According to a seventh aspect, this application provides an reminding apparatus in assisted driving. The reminding apparatus in assisted driving includes a processor, configured to implement the method described in the first aspect. The apparatus may further include a memory, configured to store a program and instructions. The memory is coupled to the processor. When executing the program and the instructions stored in the memory, the processor may implement the method described in the first aspect. The apparatus may further include an interface circuit. The apparatus may communicate with another device by using the interface circuit. For example, the interface circuit may be a transceiver, a circuit, a bus, a module, or another type of interface circuit. For example, the reminding apparatus in assisted driving may be a map server, or a chip disposed in the map server. For example, if the transceiver is implemented by using an antenna, a feeder, and code in the map server, or if the reminding apparatus in assisted driving is the chip disposed in the map server, the interface circuit may be, for example, a communication interface in the chip. The communication interface is connected to a radio frequency transceiver component in the map server, to receive and send information by using the radio frequency transceiver component. Alternatively, the reminding apparatus in assisted driving may be a terminal device, a vehicle, or a vehicle-mounted apparatus, or may be a chip disposed in the terminal device, the vehicle, or the vehicle-mounted apparatus. For example, if the transceiver is implemented by using an antenna, a feeder, and code in a vehicle-mounted apparatus, or if the reminding apparatus in assisted driving is a chip disposed in the vehicle-mounted apparatus, the interface circuit is, for example, a communication interface in the chip. The communication interface is connected to a radio frequency transceiver component in the vehicle-mounted apparatus, to receive and send information by using the radio frequency transceiver component.

For technical effects of embodiments of the sixth aspect or the seventh aspect, refer to descriptions of technical effects of corresponding embodiments of the first aspect.

According to an eighth aspect, this application provides a reminding apparatus in map-assisted driving. The reminding apparatus in map-assisted driving may be a communication device or a communication apparatus that can support the communication device in implementing a function in the method, for example, a chip system. For example, the reminding apparatus in map-assisted driving may be a server, a terminal device, a vehicle, or a vehicle-mounted apparatus. The apparatus includes:

a determining module, configured to: determine, based on a driving path planning result, that a vehicle is to pass a target intersection in a first direction, and determine, based on the map according to the second aspect or the third aspect, a first lane in which the vehicle passes the target intersection in the first direction, where the first lane is one of at least one turning violation-prone lane recorded in first information on the map; and a reminder information generation module, configured to generate reminder information, where the reminder information reminds a driver that a first lane in which the vehicle is to pass in the future based on a planned driving route is a turning violation-prone lane.

In an embodiment, the first information further includes identity information of a historical user that has a turning violation risk when the vehicle passes the target intersection from the first lane, and the identity information of the historical user includes at least one of a first identifier or first identity information. The apparatus further includes:

an obtaining module, configured to obtain identity information of a current user, where the identity information of the current user includes at least one of an identifier of the vehicle or identity information of a current driver of the vehicle; and that the reminder information generation module generates reminder information includes: The reminder information generation module generates the reminder information based on a result of consistency comparison between the identity information of the current user and the identity information of the historical user.

According to a ninth aspect, this application provides a reminding apparatus in map-assisted driving. The reminding apparatus in map-assisted driving may be a communication device or a communication apparatus that can support the communication device in implementing a function in the method, for example, a chip system. For example, the reminding apparatus in map-assisted driving may be a server, a terminal device, a vehicle, or a vehicle-mounted apparatus. The apparatus includes:

a determining module, configured to determine, based on a driving path planning result, that a vehicle is to pass a target intersection in a first direction, and determine, based on a map, a first lane in which the vehicle passes the target intersection in the first direction, where the first lane is one of at least one turning violation-prone lane recorded in the first information on the map, the map includes first information, the first information is generated based on the prompt information, and records the first lane at the target intersection as a turning violation-prone lane, and the prompt information prompts that the turn light status of the vehicle does not conform to the first turning rule of the first lane in which the vehicle is located, and a reminder information generation module, configured to generate reminder information, where the reminder information reminds a driver that a first lane in which the vehicle is to pass in the future based on a planned driving route is a turning violation-prone lane.

In an embodiment, when the distance between the vehicle and the target intersection is less than the first threshold, the prompt information is generated based on the turn light status of the vehicle and a first turning rule of the target intersection. The target intersection is a target intersection predicted based on map information, a positioning location of a vehicle, and a motion status of the vehicle. The target intersection is an intersection that the vehicle is to first pass in the future. The distance between the vehicle and the target intersection is determined based on the map information and the positioning location of the vehicle.

In an embodiment, the first information includes at least one of a first identifier of the vehicle or first identity information of a current driver of the vehicle.

In an embodiment, the first information may be information reported by the vehicle to the server, or the first information may be information stored by the vehicle.

In an embodiment, when the distance between the vehicle and the target intersection is less than the first threshold and greater than a second threshold, the prompt information is further used to prompt the vehicle to change from the first lane to a second lane, and the turn light status meets a second turning rule of the second lane at the target intersection, where the second threshold is less than the first threshold.

In an embodiment, when the distance between the vehicle and the target intersection is less than the second threshold, the prompt information is further used to prompt that the vehicle passes the target intersection from the first lane based on the first turning rule, where the second threshold is less than the first threshold.

In an embodiment, the first threshold is related to at least one of a solid line length of the first lane, a running speed of the vehicle, or a traffic congestion degree near the positioning location of the vehicle.

In an embodiment, the second threshold is related to at least one of the solid line length of the first lane, the running speed of the vehicle, or the traffic congestion degree near the positioning location of the vehicle.

In an embodiment, the first information further includes identity information of a historical user that has a turning violation risk when the vehicle passes the target intersection from the first lane, and the identity information of the historical user includes at least one of a first identifier or first identity information. The apparatus further includes:

an obtaining module, configured to obtain identity information of a current user, where the identity information of the current user includes at least one of the identifier of the vehicle or identity information of a current driver of the vehicle; and that the reminder information generation module generates reminder information includes: The reminder information generation module generates the reminder information based on a result of consistency comparison between the identity information of the current user and the identity information of the historical user.

According to a tenth aspect, this application provides a reminding apparatus in map-assisted driving. The reminding apparatus in assisted driving includes a processor, configured to implement the method described in the fourth aspect or the fifth aspect. The apparatus may further include a memory, configured to store a program and instructions. The memory is coupled to the processor. When executing the program and the instructions stored in the memory, the processor may implement the method described in the fourth aspect or the fifth aspect. The apparatus may further include an interface circuit. The apparatus may communicate with another device by using the interface circuit. For example, the interface circuit may be a transceiver, a circuit, a bus, a module, or another type of interface circuit. For example, the reminding apparatus in map-assisted driving may be a map server, or a chip disposed in the map server. For example, if the transceiver is implemented by using an antenna, a feeder, and code in the map server, or if the reminding apparatus in map-assisted driving is the chip disposed in the map server, the interface circuit may be, for example, a communication interface in the chip. The communication interface is connected to a radio frequency transceiver component in the map server, to receive and send information by using the radio frequency transceiver component. Alternatively, the reminding apparatus in map-assisted driving may be a terminal device, a vehicle, or a vehicle-mounted apparatus, or may be a chip disposed in the terminal device, the vehicle, or the vehicle-mounted apparatus. For example, if the transceiver is implemented by using an antenna, a feeder, and code in a vehicle-mounted apparatus, or if the reminding apparatus in map-assisted driving is a chip disposed in the vehicle-mounted apparatus, the interface circuit is, for example, a communication interface in the chip. The communication interface is connected to a radio frequency transceiver component in the vehicle-mounted apparatus, to receive and send information by using the radio frequency transceiver component.

For technical effects of embodiments of the eighth aspect, the ninth aspect, or the tenth aspect, refer to descriptions of technical effects of corresponding embodiments of the fourth aspect or the fifth aspect.

According to an eleventh aspect, this application provides a computer-readable storage medium, including computer instructions. When the computer instructions are run by a processor, the reminding apparatus in assisted driving is enabled to perform the method according to any implementation of the first aspect.

According to a twelfth aspect, this application provides a computer-readable storage medium, including computer instructions. When the computer instructions are run by a processor, the reminding apparatus in map-assisted driving is enabled to perform the method according to any one of the fourth aspect or the fifth aspect.

According to a thirteenth aspect, this application provides a computer program product. When the computer program product runs on a processor, the reminding apparatus in assisted driving is enabled to perform the method according to any embodiment of the first aspect.

According to a fourteenth aspect, this application provides a computer program product. When the computer program product runs on a processor, the reminding apparatus in map-assisted driving is enabled to perform the method according to any one of the fourth aspect or the fifth aspect.

According to a fifteenth aspect, a communication system is provided. The communication system includes the reminding apparatus in assisted driving according to the sixth aspect or the seventh aspect, and may further include the reminding apparatus in map-assisted driving according to the eighth aspect, the ninth aspect, or the tenth aspect.

DESCRIPTION OF EMBODIMENTS

Figure 1:
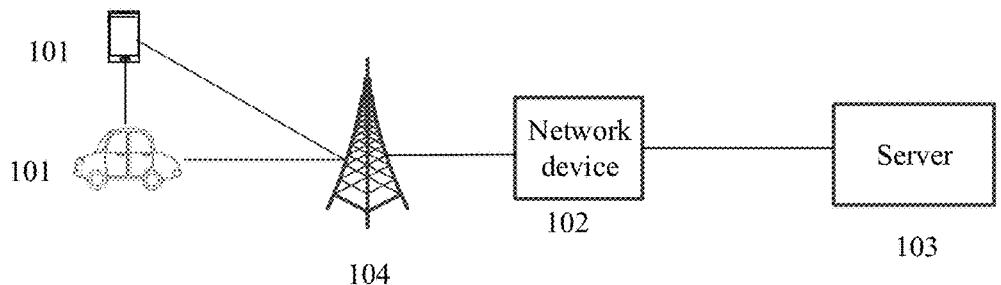
FIG. 1 is a schematic diagram of an architecture of a communication system to which an embodiment of this application is applicable.

A reminding method in assisted driving provided in embodiments of this application may be used in an intelligent transportation system. A vehicle in the intelligent transportation system may use a map to implement a traffic service. An application scenario may be unmanned driving, automated driving, intelligent driving, connected driving, or the like. The application scenario may also be an advanced driver-assistance system (ADAS) or the like. The ADAS may sense an environment around the vehicle by using a radar, to provide assistance in aspects such as blind spot monitoring, lane change assistance, collision warning, or adaptive cruise. The traffic service described in embodiments of this application may be various automated driving or assisted driving services, for example, path planning or driving risk warning provided for manual driving. The foregoing traffic service is only an example. The reminding method in assisted driving provided in embodiments of this application provides a technical preparation for fast rollout and continuous update of a communication (V2X) service between the vehicle and another apparatus, V2X may be vehicle to vehicle (V2V) and vehicle to installation (V2I).

Some terms in this application are first described, to help a person skilled in the art has a better understanding.

1) High Definition Map

In this application, the high definition map includes lane-level road information. For example, lane information in a driving scenario, for example, an intersection, a lane change, or a main road and an auxiliary road of an overpass, may include but is not limited to any one or more of the following: a start point and an end point of a lane, a lane change point, a start point and an end point of a dedicated right turn lane, attribute information of the lane, or availability information of the lane. The start point and the end point of the lane include a start point of the lane and an end point of the lane. The start point and the end point of the lane include start points and end points of several lane lines on a road. The start point of the lane is a point on a start line of the lane, and the end point of the lane is a point on a stop line of the lane. Generally, in an actual application, the start line of the lane and a stop line of a contraflow lane are in a same straight line. The lane change point may be a bifurcation generated because a turning lane is added when a road is to arrive at an intersection, may be a convergence generated because one lane is reduced when a vehicle drives in a new road after passing an intersection, or may be a bifurcation of an exit lane of an expressway/overpass, or a convergence of an entrance lane of an expressway/overpass. In conclusion, the lane change point may include but is not limited to any one or more of the following: a bifurcation generated when a quantity of lanes increases, a convergence generated when a quantity of lanes decreases, a bifurcation of an exit lane of an expressway (and/or an overpass), or a convergence of an entrance lane of an expressway (and/or an overpass). The start point and the end point of the dedicated right turn lane include a start intersection point and an end intersection point of a lane line of a dedicated right turn lane (or an extension line of a lane line) and two connected lane lines. A location of the lane may be represented by a coordinate value of a lane in a coordinate system of a global positioning system (GPS). In other words, the lane information may include a geographical coordinate of the lane. There are a plurality of methods for determining the location of the lane. For example, a location of each lane may be collected by manually labeling. Optionally, locations of the start point and the end point of the dedicated right turn lane and the start point and the end point of the lane may be determined by using this method. It should be noted that examples of the method for determining the location of the lane are only examples. This is not limited in this application.

For example, the lane information may include one or more of the following: an identifier ID of a lane, an identifier ID of a road corresponding to the lane, a number corresponding to the lane, or a type of the lane. The lane information may be represented as shown in Table 1.

TABLE 1

| Attribute name | Type | Meaning |
|---|---|---|
| Road identifier | int | Road ID |
| Lane ID | int | Lane direction:<br>Two-way road: [−n . . . −1] indicates the $n^{th}$ contraflow lane to the first contraflow lane<br>[0] indicates a central lane line<br>[1 . . . n] indicates the first forward lane to the $n^{th}$ forward lane<br>One-way road: [0 . . . n] indicates the $0^{th}$ forward lane to the $n^{th}$ forward lane<br>Reversible lane: [−n . . . −1] indicates the $n^{th}$ contraflow lane to the first contraflow lane, or [1 . . . n] indicates the first forward lane to the $n^{th}$ forward lane |
| type_1 | int | 0: a lane change point<br>1: a start point and an end point of a lane<br>2: a start point and an end point of a dedicated right turn lane |
| type_2 | int | A lane change point: −1 indicates a quantity of lanes decreases (an inbound lane)<br>1 indicates a quantity of lanes increases (a fork lane)<br>A start point and an end point of a lane: −1 indicates a start point<br>1 indicates an end point<br>A start point and an end point of a dedicated right turn lane: −1 indicates a start point<br>1 indicates an end point<br>The leftmost or rightmost lane in a forward direction is a lane in which numbering starts |
| type_3 | | A left turn lane, a straight lane, a right turn lane, a main road lane, and an auxiliary road lane<br>A curvature and a slope of a road/lane |
| type_4 | | Availability information of a lane: traffic control information, road maintenance information, traffic rules, road conditions, and congestion information |

The road identifier (road_ID) indicates an ID of a road on which the lane information is mapped to a navigation map, distinguish different roads, and establish a mapping relationship between the lane information and the road on the navigation map. Herein, road_ID comes from a route attribute on a traditional navigation map. The lane identifier may be a lane number or a lane line number (lane_num) that indicates a number of a lane in which the lane information is located and distinguishes different lane lines or lane directions. For example, a two-way road includes a forward lane, a contraflow lane, a reversible lane, and the like. Numbers [−n . . . −1] may be used to indicate the $n^{th}$ contraflow lane to the first contraflow lane, [0] may indicate a central lane line, and numbers [1 . . . n] may indicate the first forward lane to the $n^{th}$ forward lane. For a one-way road, numbers [0 . . . n] may indicate the $0^{th}$ forward lane to the $n^{th}$ forward lane.

Further, the lane information may be classified into a plurality of types of lane information based on different types. For example, the lane information may include a type 1 (type_1) of the lane information, a type 2 (type_2) of the lane information, a type 3 (type_3) of the lane information, and a type 4 (type_4) of the lane information. The type 1 of the lane information may include a lane change point, a start point and an end point of a lane, and a start point and an end point of a dedicated right turn lane. Different types are indicated by different numbers, index numbers, or IDs. For example, 0 may indicate the lane change point, 1 may indicate the start point and the end point of the lane, and 2 may indicate the start point and the end point of the dedicated right turn lane. The type 2 of the lane information is further a refinement of the type 1 of the lane information. Different numbers, index numbers, or IDs may further indicate the type 1 of the lane information. For example, a value −1 indicates that a subtype of the lane change point is that the quantity of lanes decreases. A value 1 indicates that the subtype of the lane change point is that the quantity of lanes increases. A value −1 indicates that a subtype of the start point and the end point of the lane is the start point of the lane. A value 1 indicates that the subtype of the start point and the end point of the lane is the end point of the lane. A value −1 indicates that a subtype of the start point and the end point of the dedicated right turn lane is the start point of the dedicated right turn lane, and 1 indicates that the subtype of the start point and the end point of the dedicated right turn lane is the end point of the dedicated right turn lane.

The type 3 (type_3) of the lane information may indicate an attribute feature, for example, the lane is a left turn lane, a straight lane, a right turn lane, a main road, or an auxiliary road, and may further include attribute information such as direction information of the lane, and a curvature and a slope of the road/lane. Certainly, the attribute information of the lane may further include information such as an inbound lane, a fork lane, a two-way lane, a one-way lane, and a reversible lane.

The type 4 (type_4) of the lane information may indicate the availability information of the lane, that is, information indicating whether the lane is currently available, for example, traffic control, road maintenance, and a traffic rule (for example, dedicated bus lane information, speed limit information, large vehicle lane information, small vehicle lane information, and traffic restriction information), road conditions, and congestion information. Herein, lane_num, the type, the type_2, the type_3, and the type_4 may be obtained when the high definition map is drawn or updated.

To further improve accuracy of the map, the high definition map may further include a virtual lane line layer. A virtual lane line may be generated based on lane information that is generated based on a high definition map layer, and may indicate a driving direction and a boundary of a drivable lane on a road without a lane line mark. For example, the virtual lane line may be a virtual curve connecting an entrance and exit lane of an intersection, may be considered as a reference track line along which a vehicle travels in an intersection area, or may be a road under construction, a road on which a line is blocked in different environments, a tunnel, or the like.

2) Numbers such as first and second in embodiments of this application are only used for differentiation for ease of description, are not used to limit the scope of embodiments of this application, and do not indicate a sequence. The term "and/or" describes an association relationship for describing associated objects and represents that three relationships may exist. For example, A and/or B may represent the following three cases: Only A exists, both A and B exist, and only B exists. "At least one" means one or more. At least two means two or more. "At least one", "any one", or a similar expression thereof indicates any combination of these items, including a single item (piece) or any combination of a plurality of items (pieces). For example, at least one item (piece) of a, b, or c may indicate: a, b, c, a-b, a-c, b-c, or a-b-c, where a, b, and c may be singular or plural.

The following further describes in detail embodiments of this application with reference to accompanying drawings. It is clear that the described embodiments are only some but not all of embodiments of this application. A specific operation method in a method embodiment may also be applied to an apparatus embodiment.

FIG. 1 is a schematic diagram of a possible architecture of a communication system to which an embodiment of this application is applicable. The communication system shown in FIG. 1 includes a terminal device 101, a network device 102, a server 103 (which may include a map server, a positioning server, a cloud server, and the like), and an access device 104. It should be understood that FIG. 1 is only the schematic diagram of the architecture of the communication system. A quantity of the network device 102, a quantity of the access devices 104, and a quantity of the terminal devices 101 in the communication system are not limited in this embodiment of this application. In addition to the network device 102, the access device 104, the server 103, and the terminal device 101, the communication system to which this embodiment of this application are applicable may further include other devices, such as a core network device, a wireless relay device, and a wireless backhaul device. In some scenarios, it may be alternatively considered that the network device 102 is a special core network device. Whether the network device 102 is a core network does not affect this embodiment of this application. This is not limited in this embodiment of this application. In FIG. 1, the terminal device 101 may be connected to the access device 104 in a wireless manner, and may establish a communication connection to the network device 102 by using the access device 104. There may be more than one terminal device 101. Alternatively, the terminal device 101 may be connected to the access device 104 in the wireless manner, and may establish a communication connection to another terminal device 101 by using the access device 104. Alternatively, the terminal device 101 may establish the communication connection to another terminal device 101 in a wired manner. This is not limited herein. In this embodiment of this application, a quantity relationship between various devices is not limited. For example, a plurality of terminal devices may communicate with a same access device, or a plurality of access devices may communicate with a same network device. The communication system to which the foregoing system architecture is applicable includes but are not limited to: a time division duplexing-long term evolution (TDD LTE) system, a frequency division duplexing-long term evolution (FDD LTE) system, a long term evolution-advanced (LTE-A) system, and various other evolved wireless communication systems, for example, a $5^{th}$ generation (5G) new radio (NR) communication system, or various future evolved wireless communication systems. In this embodiment of this application, the access device 104 may be a device that may communicate with the terminal device. For example, the access device may be any device having a wireless transceiver function, including but not limited to: a base station (for example, a base station, an evolved base station, a base station in a 5G communication system, a base station or a network device in a future communication system, an access node, a wireless relay node, or a wireless backhaul node in a wireless-fidelity (Wi-Fi) system), and the like. Alternatively, the access device may be a wireless controller in a cloud radio access network (CRAN) scenario.

Alternatively, the access device may be a small cell, a transmission reference node (TRP), or the like. Certainly, this application is not limited thereto. In subsequent descriptions of this embodiment of this application, any information transmission between the terminal device 101 and the network device 102 includes a meaning that the terminal device 101 and the network device 102 implement information transmission by using the access device 104. Details are not described in this embodiment of this application. In this embodiment of this application, the terminal device 101 is a device having a wireless transceiver function. The terminal device 101 may send a request to the network device 102, and obtain data such as high definition map data and prompt information from the network device 102. The terminal device 101 may enable a positioning function and a navigation function by using the high definition map data, and may further provide a reminding function in assisted driving for a user by using the prompt information. The terminal device 101 may be an intelligent terminal such as an unmanned vehicle or a robot, may be a vehicle-mounted terminal configured to enable an unmanned driving function, or may be a mobile phone, a tablet computer, a vehicle-mounted navigation terminal, or the like. Alternatively, the terminal device may also be a handheld device, a vehicle-mounted device, or the like that has a wireless connection function. The terminal device in this application may be a vehicle-mounted radar, a mobile phone, a tablet computer, a notebook computer, a palmtop computer, a mobile internet device (MID), or a wearable device, for example, a smart watch, a smart band, or a pedometer. In this embodiment of this application, the terminal device may alternatively be a device having a GNSS positioning function.

In this embodiment of this application, the network device 102 may integrate all functions into one independent physical device, or may distribute functions on a plurality of independent physical devices. This is not limited in this embodiment of this application either. The network device 102 is a device having a wireless transceiver function, and may enable a specific service function based on service information of the terminal device obtained by another device in a core network. For example, in a 5G NR, the network device may be a mobile edge computing (MEC) network element. The MEC network element may deploy an application, content, and some service processing and resource scheduling functions of a mobile broad band (MBB) core network together at a network edge close to an access side (access device), so that a service may be processed close to the user, and the application, the content, and the network collaborate with each other, to provide reliable and ultimate service experience. It may be understood that in a $4^{th}$ generation (4G) wireless communication network, a $3^{rd}$ generation (3G) wireless communication network, or another network, a network element having a similar function may also be disposed. Therefore, a specific embodiment of the network device is not limited in this embodiment of this application. In this embodiment of this application, when the network device 102 is the MEC network element, an application may be loaded to the MEC network element, so that the MEC network element performs the operations performed by the network device 102 in the data transmission method provided in embodiments of this application, to provide a service for a user terminal at an edge of a core network close to an access side. This reduces an interaction delay. The server and the network device 102 may exchange data by using the core network.

In this embodiment of this application, the map server may be a server in the Internet, may be a single server having large storage space, may be a server cluster including a plurality of servers, or may be a cloud server having ultra-large storage space. The map server is usually deployed at one or more fastened locations. In an embodiment, the map server may store map data of a high definition map. Because of enough storage space of the map server, map data of a high definition map within a large coverage area may be stored. The high definition map may be stored in a form of a map file. The map file may be in a spatial data open format, and is a file that describes geometric and attribute features of spatial data and stores a geographic element. The map file of the high definition map mainly contains geometric information and attribute information. The geometric information is a spatial coordinate of lane information, that is, a location of the lane information. The attribute information is information about a lane information attribute, for example, whether a lane is a main road lane or an auxiliary road lane, and whether the lane is a straight lane, a right turn lane, a left turn lane, or another lane. In this application, the high definition map may provide a precise indication for a vehicle in a driving scenario. For example, in a typical scenario in which a weather condition is severe or a turning sign on a lane ground does not conform to a driving habit, lane-level road information may be provided by using the high definition map, to generate prompt information. This avoids a case in which a driver violates a traffic rule due to misjudgment of the lane. Alternatively, in a scenario in which a GNSS cannot position, for example, a scenario in which there is no lane sign, or the vehicle is in a tunnel, positioning and lane information may be provided for the vehicle, to improve driving experience of the vehicle.

Figure 2:
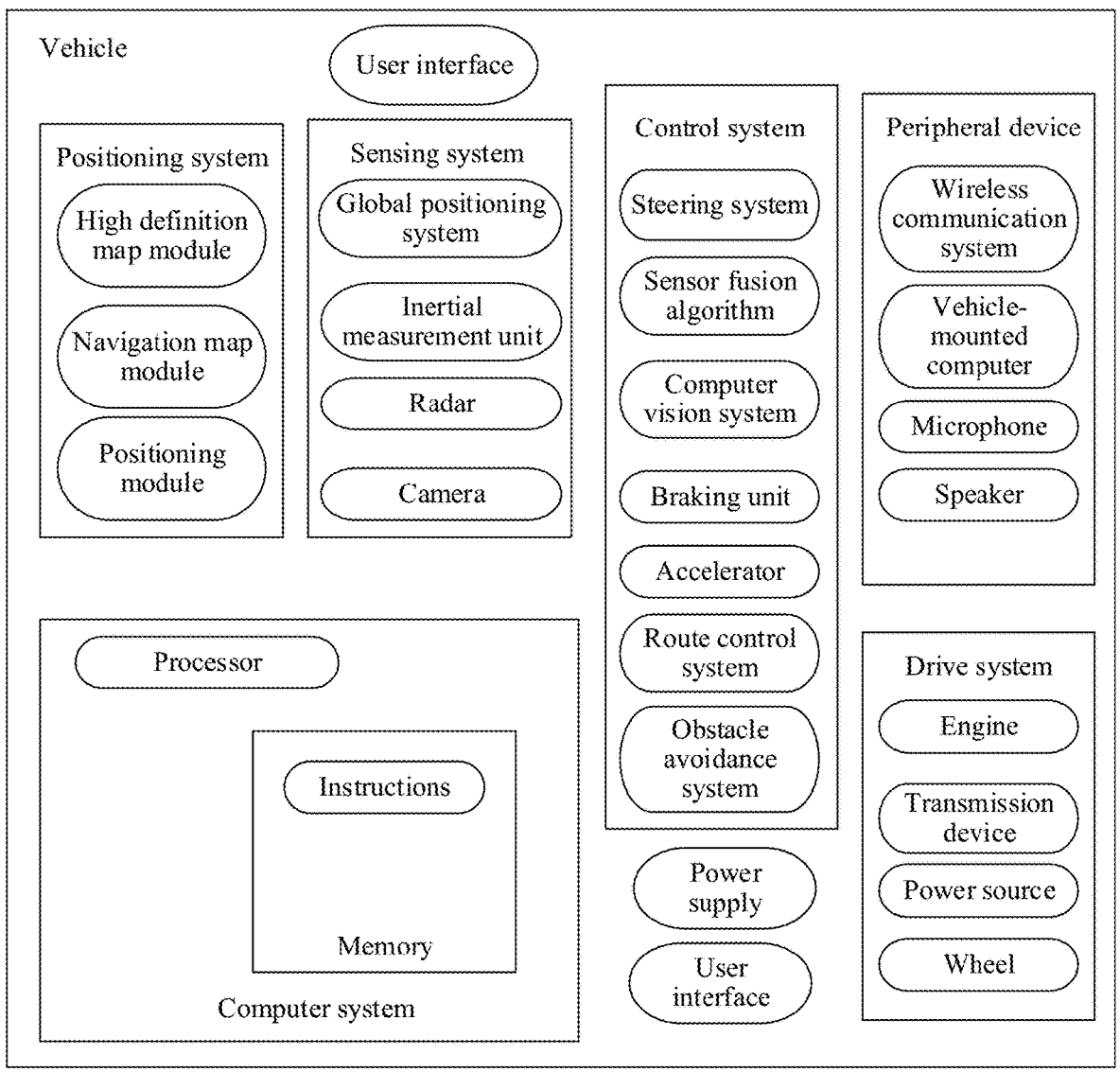
FIG. 2 is a schematic diagram of a structure of a vehicle according to an embodiment of this application.

FIG. 2 is a functional block diagram of a vehicle according to an embodiment of this application. In an embodiment, the vehicle may be configured to be in a fully or partially automated driving mode, or the vehicle may be configured to be in a fully manual driving mode. This is not limited herein. The vehicle may include various subsystems, such as a user interface, a positioning system, a sensor system, a computer system, a control system, a moving system, one or more peripheral devices, a computer system, a user interface, and the like. The positioning system may include a high definition map module, a positioning module, a navigation module, and the like. Optionally, the vehicle may include more or fewer subsystems, and each subsystem may include a plurality of elements. In addition, each subsystem and element of the vehicle may be interconnected in a wired or wireless manner. Each system and module have the following specific functions.

The user interface may implement information exchange with a user when the vehicle is running. For example, if prompt information is generated when the vehicle is running, the prompt information may pop up on the user interface. In response to an operation (the operation may be a voice operation, a touch operation, a button operation, a gesture operation, or the like, which is not limited herein) performed by the user on the prompt information, other prompt information may be displayed, to improve experience of the user in a driving process.

In another possible scenario, when the user needs to travel, the navigation module pops up an indication on the user interface, indicating the user to enter a driving destination on the user interface. For another example, after the user sets the driving destination, and a driving planning module in the navigation module determines an optimal driving path, the driving path finally determined by the navigation module may be displayed on the user interface. Further, historical prompt information may be further displayed. For another example, when the vehicle is running, the navigation module may update, on the user interface in real time, a current location of the vehicle and a road condition on a driving path, for example, a congestion condition, an impassable condition, or a road repair condition.

The positioning system may be a GPS system, a COMPASS system, or another positioning system. The positioning system may be configured to estimate a geographical location of a terminal device, or may be configured to receive location information of the terminal device that is sent by the positioning server. The positioning system may determine a location of the terminal device by using a GNSS positioning method. The positioning system may further include a positioning network element in a core network. In a 5G communication system, the positioning network element may be a service capability exposure function (SCEF) network element in the core network and/or a positioning server. In an embodiment, the SCEF network element may obtain location information of the terminal device 101 from the positioning server. The positioning server may position the terminal device by one or more of a positioning method based on a cell identity (Cell ID), a positioning method based on time difference of arrival (TDOA), and a positioning method based on an angle of arrival (AOA), to obtain the location information of the terminal device. Specifically, the positioning server may be an enhanced serving mobile location center (E-SMLC) network element, and/or a gateway mobile location center, or one or more network elements having a similar function. This is not limited in this embodiment of this application. It should be understood that, in this embodiment of this application, the positioning server and the network device 102 may belong to a same physical device, or may separately belong to different physical devices. For example, if the terminal device 101 is a vehicle-mounted device, the positioning module may be disposed on the vehicle, or the positioning module is a vehicle-mounted device. When the positioning module is disposed on the vehicle, specifically, the positioning terminal may be disposed on a top of the vehicle, or may be disposed at another location that needs to be positioned. If the terminal device 101 is a non-vehicle-mounted device such as a mobile phone, the positioning module may be disposed on the non-vehicle-mounted device such as a mobile phone. A positioning module on the terminal device 101 may send a positioning request to the positioning server, and receive location information of the positioning module that is returned by the positioning server.

The high definition map module is configured to store lane-level road information of a high definition map. The high definition map module may be further configured to receive map data of the high definition map that is sent by a map server. Certainly, the map data of the high definition map in the high definition map module may also be periodically updated. This is not limited herein. The map data of the high definition map in the high definition map module may be a high definition map stored in the terminal device in advance, or may be a high definition map that is sent by the map server to the terminal device. The high definition map may also be updated by the vehicle or the map server. For example, lane information may be collected by using the map server for the vehicle, and sent to the map server. The map server determines the latest lane information. The map server may actively send an updated high definition map to the terminal device, or may return, based on a query request that is sent by the terminal device, updated lane information corresponding to the high definition map. In a specific embodiment, in a navigation process, map data of a high definition map of a corresponding area may be sent to save high definition map data that needs to be stored by the terminal device 101, map data of high definition maps of a plurality of areas may be delivered in advance to the map server, or the map data of the high definition map in the high definition map module may be updated based on a requirement for updating the map data of the high definition map.

The high definition map module may determine, based on the geographical location that is of the terminal device and that is determined by the positioning system, a location of the terminal device on the high definition map. In this way, positioning precision reaches lane-level positioning precision. The vehicle may perform feature matching on information that is about a surrounding environment of the vehicle and that is determined by a sensor system and a computer vision system and the high definition map data, to determine a positioning location of the vehicle on the high definition map. In this way, positioning precision may reach the lane-level positioning precision.

The navigation map module may store navigation map data, and generate a navigation track based on a navigation map, to enable a navigation function. The navigation map may provide navigation information for the user, to meet a navigation requirement of a driving route. For example, the navigation map may provide navigation information such as a quantity of lanes on a current road, speed limit information, turning information, and route planning. After determining at least one driving path, the navigation map module may submit the driving paths to a driving planning module of an automated driving system, so that the driving planning module may select, from the driving paths based on a user requirement, a driving path that most conforms to the user requirement. Further, the navigation map module may further receive reminder information that is sent by a reminding module in assisted driving or a server. The reminder information is generated based on prompt information generated in a reminding system in assisted driving, so that the reminder information may be personalized for the user. For example, the reminder information is generated based on a wrong road section that a user goes, or historical prompt information is directly displayed on a navigation interface, and a navigation route may be properly planned based on the historical prompt information. This improves driving experience of the user.

The sensor system may include several sensors that sense information about the surrounding environment of the vehicle. For example, the sensor system may include a positioning system, an inertial measurement unit (IMU), a radar, and a camera. The IMU is configured to sense a location and an orientation change of the vehicle based on an inertial acceleration. In an embodiment, the IMU may be a combination of an accelerometer and a gyroscope. The radar may use a radio signal to sense an object in the surrounding environment of the vehicle. In some embodiments, in addition to sensing the object, the radar may be further configured to sense a speed and/or a forward direction of the object. The camera may be configured to capture a plurality of images of the surrounding environment of the vehicle. The camera may be a static camera or a video camera. Further, the vehicle may further include the computer vision system, which may operate to process and analyze an image captured by the camera, to recognize an object and/or a feature in the surrounding environment of the vehicle. The object and/or the feature may include a traffic signal, a road boundary, and an obstacle.

The computer vision system may use an object recognition algorithm, a structure from motion (SFM) algorithm, a video tracking technology, and other computer vision technologies. In some embodiments, the computer vision system may be configured to draw a map for an environment, track an object, estimate a speed of the object, and the like.

One or more types of sensors may be disposed on each vehicle, and there may be one or more sensors of each type. The sensor may be installed on the top of the vehicle, and may be disposed at a middle location on the top of the vehicle. The installation location and a quantity of sensors in each vehicle are not limited in this embodiment of this application. In this embodiment of this application, the vehicle may communicate with another object based on a vehicle to everything wireless communication technology (for example, vehicle to everything (V2X)). For example, vehicle-to-vehicle communication may be implemented based on an inter-vehicle wireless communication technology (for example, vehicle to vehicle (V2V)). The vehicle may communicate with another object based on a wireless fidelity (for example, wireless fidelity (Wi-Fi)) or a $5^{th}$ generation (5G) mobile communication technology. For example, communication between the vehicle and an intelligent device (such as a smartphone or a mobile device that supports a positioning function) may be implemented based on 5G.

The user interface is configured to provide information to or receive information from the user of the vehicle. Optionally, the user interface may include one or more input/output devices within a set of peripheral devices, such as a wireless communication system, a vehicle-mounted computer, a microphone, and a speaker. The vehicle interacts with an external sensor, another vehicle, another computer system, or a user by using the peripheral device. The peripheral device may include a wireless communication system, a vehicle-mounted computer, a microphone, and/or a speaker. In some embodiments, the peripheral device provides a means for the user of the vehicle to interact with the user interface. For example, the vehicle-mounted computer may provide the user of the vehicle with information such as prompt information and reminder information. The user interface may further operate the vehicle-mounted computer to receive input from the user. The vehicle-mounted computer may be operated by using a touchscreen, a voice, a gesture, or the like. In other cases, the peripheral device may provide means for the vehicle to communicate with another device disposed in the vehicle. For example, the microphone may receive audio (for example, a voice command or another audio input) from the user of the vehicle. Similarly, the speaker may output the audio to the user of the vehicle.

The user interface may further include an information collection module. The information collection module may collect a driving status of the vehicle, for example, a current turn light status of the vehicle, and information such as a speed and an acceleration of the vehicle.

The wireless communication system may directly communicate with one or more devices in the wireless manner, or may communicate with one or more devices via a communication network in the wireless manner. For example, the wireless communication system may use 3G cellular communication, such as CDMA, EVD0, GSM/GPRS, may use 4G cellular communication, such as LTE, or may use 5G cellular communication. The wireless communication system may communicate with a wireless local area network (WLAN) on Wi-Fi. In some embodiments, the wireless communication system may directly communicate with the device by using an infrared link, a Bluetooth, or a ZigBee. Other wireless protocols, for example, various vehicle communication systems, such as the wireless communication system, may include one or more dedicated short range communication (DSRC) devices. The devices may include public and/or private data communication between a vehicle and/or a roadside station.

Some or all functions of the vehicle are controlled by the computer system. The computer system may include at least one processor. The processor executes instructions stored in a non-transient computer-readable medium such as a memory. The computer system may alternatively be a plurality of computing devices that control individual components or subsystems of the vehicle in a distributed manner.

In this application, the processor may be configured to perform a reminding method in assisted driving and a map usage method. The processor may be any conventional processor, such as a commercially available CPU. Alternatively, the processor may be a dedicated device such as an ASIC or another hardware-based processor. Although FIG. 2 functionally illustrates a processor, a memory, and other elements of a computer in a same block, a person of ordinary skill in the art should understand that the processor, the computer, or the memory may actually include a plurality of processors, computers, or memories that may or may not be disposed in a same physical housing. For example, the memory may be a hard disk drive or another storage medium disposed in a housing of different computer. Therefore, it is understood that a reference to the processor or the computer includes a reference to a set of processors, computers, or memories that may or may not operate in parallel. This is different from that a single processor performs the operations described herein, for example, each component that performs the reminding method in assisted driving and the map usage method in this application may have its own processor, and the processor performs only a calculation related to component-specific functions.

In various aspects described herein, the processor may be disposed far away from the vehicle and may communicate with the vehicle in the wireless manner. In other aspects, some processes described herein are performed on a processor arranged in the vehicle and others are performed by a remote processor, including performing the operations to perform a single manipulation.

In some embodiments, the memory may include instructions (for example, program logic), and the instructions may be executed by the processor to enable various functions of the vehicle, including the functions described above. The memory may also include additional instructions, including instructions for sending data to, receiving data from, interacting with, and/or controlling one or more of subsystems.

In addition to the instructions, the memory may further store data, for example, a road map, route information, a location, a direction, and a speed of the vehicle, other vehicle data, and other information such as obtained prompt information. The prompt information may be: When the vehicle is running, if a turn light status does not conform to a turning rule of a lane in which the vehicle is located, violation prompt information may be generated. Such information may be used by the vehicle and the computer system when the vehicle operates in an autonomous mode, a semi-autonomous mode, and/or a manual mode. The obtained prompt information may be further sent to a cloud server by using the wireless communication system, so that the cloud server obtains the prompt information, and performs statistical analysis based on the obtained prompt information of at least one vehicle, to form a guide for traffic, a road condition, an individual user, and the like. For example, when the vehicle passes the location at which the prompt information is generated, the vehicle may prompt, based on the received prompt information, information such as a lane on which a driving error has occurred in history at the location, to prompt a possibility of a driving violation. This improves driving experience of the user. The cloud server may further send the prompt information to the terminal device. Therefore, when logging in to a corresponding application on the terminal device, the user may query prompt information obtained by the user in a driving process, so that the user may avoid a possible violation in a subsequent driving process. This improves driving experience.

The computer system may control functions of the vehicle based on input received from various subsystems (for example, the positioning system, the sensor system, the computer vision system, and the like) and the user interface. For example, the computer system may use input from a control system to control a user interaction interface to output the prompt information. In some embodiments, the computer system may operate to provide control on the vehicle and subsystems of the vehicle in many aspects.

Further, in the automated driving system, the vehicle may further include a driving planning module, a tracker, an actuator, and the like. The driving planning module is configured to determine, based on a trip requirement set by the user from the at least one driving path determined by the navigation map module in the automated driving system, a driving path that most conforms to the user requirement and information about a driving configuration on a path in a schematic diagram of a corresponding driving structure, and send a determined driving planning result to the tracker and the actuator. The tracker and the actuator complete an entire automated driving process. The tracker is configured to generate, based on the driving path sent by the driving planning module and the information of the driving configuration on the corresponding driving path, a torque instruction for driving the automated driving system and a braking instruction for driving a braking system, issue the torque instruction and the braking instruction to a corresponding actuator for execution, and collect feedback information of the corresponding actuator in a process of executing the instruction. The actuator includes a drive system and the braking system, and is configured to control driving of the vehicle based on the torque instruction and the braking instruction that are issued by the tracker.

Optionally, one or more of the foregoing components may be separately installed from or associated with the vehicle. For example, the memory may be partially or completely separated from the vehicle. The foregoing components may be communicatively coupled together in a wired and/or wireless manner.

Optionally, the foregoing components are only examples. In actual application, components in the foregoing modules may be added or deleted based on an actual requirement. FIG. 2 should not be understood as a limitation on this embodiment of this application.

In a typical scenario in which a weather condition is severe or a turning sign on a lane ground does not conform to a driving habit, for example, in a severe weather condition, because the turning sign on the lane ground may be blocked by an accumulated object such as rain and snow on the ground, and air visibility is reduced in haze weather, a visible range of the driver is limited, resulting that the driver cannot correctly judge the lane, or in an unfamiliar road section, the turning sign on the lane ground does not conform to the driving habit. For example, due to inertial thinking of most people, the leftmost lane may be a left turn lane. However, the leftmost lane of a road section is a right turn lane, resulting that the driver may habitually misjudge the lane. As a result, the driver may violate a traffic rule, which may even cause a traffic accident in serious cases.

Based on the foregoing problem, this application provides a reminding method in assisted driving. The reminding method in assisted driving provided in this application may be performed by a vehicle, a terminal device, or a cloud server. In a possible manner, the method may be performed by a computer system of a vehicle, or may be performed by an independent vehicle-mounted device in the vehicle. For example, when the vehicle is running, the vehicle may display, by using a user interface on the vehicle, prompt information generated by the vehicle, or may play the prompt information by using a loudspeaker in the vehicle, to notify a user and enable a reminding function in assisted driving.

In another embodiment, the method may also be performed by a terminal device such as a mobile phone. The user may open a corresponding application to perform the reminding method in assisted driving. For example, the reminding method in assisted driving may be used together with a navigation system. When the user opens the corresponding application (for example, a navigation application) of the navigation system, prompt information generated by the reminding system in assisted driving may be received at the same time, so that the prompt information is played and/or displayed in the navigation application. Alternatively, after a connection to the vehicle is established by using a terminal device such as a mobile phone, and the prompt information generated by the vehicle is sent to the terminal device, the terminal device displays a prompt box on a display interface of the terminal after receiving the prompt information, to remind the user, so that the user may view the prompt information when the vehicle subsequently stops running. Alternatively, the prompt information is played in a voice broadcast manner.

In another embodiment, the reminding method in assisted driving may be performed by a server (for example, a positioning server, a map server, or a cloud server). The server may send prompt information to the vehicle based on the generated prompt information, so that the vehicle plays or displays the prompt information based on the received prompt information. Alternatively, the server may send the prompt information to the terminal device based on the received prompt information generated by the vehicle. Therefore, the terminal device may receive the prompt information, and the user may view the prompt information when the vehicle subsequently stops running. The terminal device may be a terminal device that has a same account as the vehicle. For example, the terminal device may send, based on an application corresponding to the vehicle, a query request of the prompt information to the server, so that the terminal device may determine prompt information corresponding to the vehicle by using the server, and may return the prompt information to the terminal device. Alternatively, after obtaining the prompt information, the server actively pushes the prompt information to the terminal device. A pushing method may be pushing to a corresponding application (for example, an application corresponding to the vehicle, a navigation application, or a map application), or may be pushing to a notification bar on a display interface. This is not limited herein.

Figure 3:
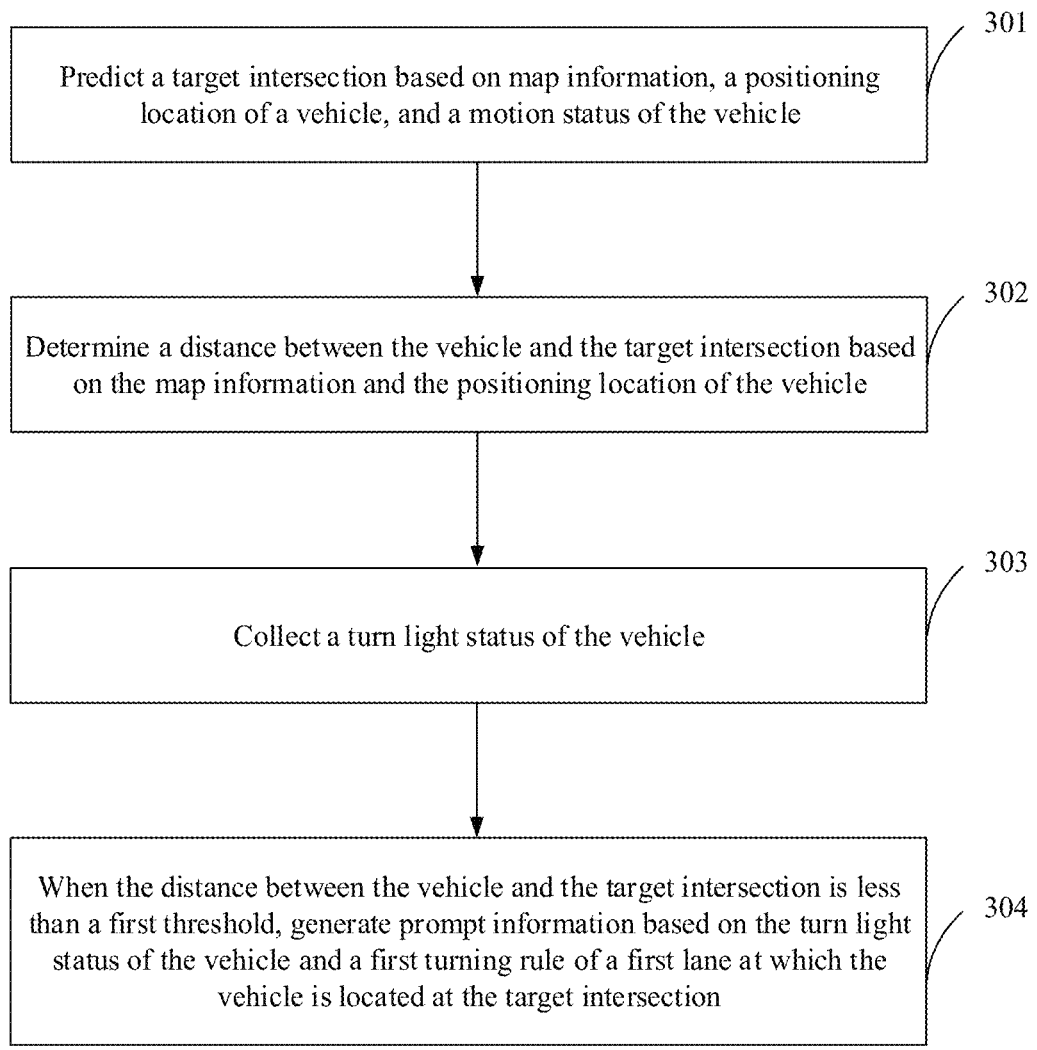
FIG. 3 is a schematic flowchart of a reminding method in assisted driving according to an embodiment of this application.

The following uses an example in which the method is performed by a vehicle. As shown in FIG. 3, the method includes the following operations.

Operation 301: Predict a target intersection based on map information, a positioning location of a vehicle, and a motion status of the vehicle.

The positioning location of the vehicle and the motion status of the vehicle may be determined in a plurality of manners. The following uses a manner a1 and a manner a2 as examples for description.

Manner a1: The positioning location of the vehicle may be a positioning location determined by positioning through a GNSS. The positioning location of the vehicle may be a coordinate value of a point of the vehicle in a GNSS coordinate system, and is a geographical coordinate of the vehicle. The motion status of the vehicle may be a driving direction determined based on a historical positioning location and a current positioning location of the vehicle.

Manner a2: The positioning location of the vehicle may be a positioning location determined based on a high definition map. For example, the positioning location of the vehicle may be a positioning location that is of the vehicle on the high definition map and that is determined by a high definition map module based on location information received by a positioning module and surrounding environment information of the vehicle that is obtained by a sensor system, and may include one or more of the following: a coordinate location of the vehicle on the high definition map, a lane in which the vehicle is located, attribute information of the lane in which the vehicle is located, or a motion status of the vehicle. The motion status of the vehicle may be determined by using a vehicle posture sensor in combination with the GNSS. For example, the motion status of the vehicle may include vehicle posture information, and acceleration information and speed information of the vehicle. The vehicle posture information may be determined by using a sensor such as a radar or a camera of the vehicle in combination with the GNSS. The speed information and the acceleration information may be determined based on data collected by the vehicle posture sensor. The vehicle posture sensor may include a 3-dimensional accelerometer, a magnetic sensor, a gyroscope, and the like. This is not limited in this application. In another embodiment, after the positioning location of the vehicle is obtained, information of a lane corresponding to the current positioning location at which the vehicle is located may be further determined based on the high definition map, and a head orientation of the vehicle may be estimated. For example, if it is determined, based on the information of the lane in which the positioning location of the vehicle is located, that the lane in which the vehicle is located is a lane from south to north, it may be inferred that the head direction of the vehicle is from south to north.

The map information may be map information of a navigation map, or may be map information of the high definition map. For example, the reminding method in assisted driving is performed by the vehicle. The vehicle may obtain the map information by using a server (for example, a map server). The following uses manner b1 and manner b2 as examples.

Manner b1: The target intersection may be predicted by using the navigation map. The navigation map is a conventional navigation map. Navigation and positioning are performed by using a GNSS device. The conventional navigation map can provide only road-level map information. The navigation map may provide navigation information for the user, to meet a navigation requirement of a driving route. For example, the navigation map may provide navigation information such as a quantity of lanes on a current road, speed limit information, turning information, and route planning. When a good positioning signal may be obtained by using the GNSS, the positioning location of the vehicle and the motion status (for example, a moving direction of the vehicle and the head orientation of the vehicle) of the vehicle may be determined based on the GNSS, so that an intersection that the vehicle is to first pass in the future, that is, the target intersection, may be determined based on road-level map information on the navigation map.

Manner b2: For example, in a scenario such as a shade, an urban canyon, or a tunnel, GNSS positioning is prone to drift, and there is a probability that the positioning signal of the GNSS may not be obtained. As a result, the vehicle may not be accurately positioned. In addition, due to impact of GNSS positioning precision, positioning precision of the vehicle may be positioned only on a road, and it is difficult to determine a specific lane in which the vehicle is located. Considering the foregoing reasons, the positioning location of the vehicle (lane-level road information may be determined) and the motion status of the vehicle may be determined in another positioning manner, for example, with reference to a sensor system (a camera, a radar, an IMU, or the like) of the vehicle, a computer vision system, and map data of the high definition map, to predict the target intersection.

For another example, in different road environments, for example, in a condition of an obstruction (for example, a falling leaf), and in a condition of accumulated water or accumulated snow, a lane included in a road ahead may be determined based on the lane information on the high definition map, to avoid impact of the obstruction on driving of a driver, and provide the driver with lane information obtained after the obstruction is removed. For example, when a lane is covered by an obstruction, a road identifier such as a driving direction identifier and a lane boundary of the lane may be blocked. In this case, the obstruction may be removed based on lane information on the high definition map, and prompt information is generated. For example, if the accumulated water area occupies one lane, in this case, it may be detected, based on information detected by the sensor, that there is accumulated water on the road ahead, and it may be determined, based on the lane information on the high definition map, that the lane is covered by the accumulated water. The driver may not determine a driving direction of the lane ahead, and prompt information is generated to indicate the driving direction of the lane ahead. Alternatively, it is determined, based on information detected by the sensor, that congestion occurs ahead, and a driving identifier of the lane may be blocked. In this case, it may be determined that the lane is blocked. The driver may not determine a driving direction of the lane ahead, and prompt information is generated to indicate the driving direction of the lane ahead.

Further, to reduce a calculation amount, the target intersection may alternatively be an intersection that meets an intersection type. For example, an intersection type of the target intersection may be an intersection including a bifurcation, for example, a crossroad and a T-type intersection, or an intersection including an entrance and an exit of an overpass, and an intersection including an entrance and an exit of a tunnel. The type of the target intersection may be determined based on intersection information on the navigation map, or may be determined based on lane information on the map. This is not limited herein.

Operation 302: Determine a distance between the vehicle and the target intersection based on the map information and the positioning location of the vehicle.

With reference to the foregoing example, in an embodiment, the distance between the vehicle and the target intersection may be determined based on coordinate information of the intersection on the navigation map and the positioning location of the vehicle on the navigation map. In an embodiment, the distance between the vehicle and the target intersection may be determined based on coordinate information of the target intersection on the map and the positioning location of the vehicle on the map.

Operation 303: Collect a turn light status of the vehicle.

The turn light status of the vehicle may include: a left turn state, a right turn state, a straight state, a short-time left turn state, or a short-time right turn state. A turn light of the vehicle includes at least two modes. For example, when the user toggles a control of the turn light downward, but does not toggle the control to the bottom, a left turn light of the vehicle starts to blink, and stops blinking at preset time. In this case, the turn light is in the short-time left turn state. For example, when the user toggles down the control of the turn light and toggles the control to the bottom, the left turn light of the vehicle starts to blink, and stop blinking until the vehicle turns left or stops blinking after the driver resets the turn light. In this case, it may be determined that the turn light status is the left turn state. Similarly, the right turn state is a state in which the user toggles the control of the turn light upward, and toggles the control to the top. The short-time right turn state is a state in which the user toggles the turn light control upward, but does not toggle the control to the top. The straight state is a state in which the turn light of the vehicle does not blink. In a special scenario, for example, when a hazard warning signal light (a warning mode) of the vehicle is turned on, the turn light status cannot be determined based on blinking of the turn light of the vehicle. In this case, the turn light status of the vehicle may be determined based on an operation performed by the user on the control of the turn light.

There may be a plurality of manners of collecting the turn light status of the vehicle. The following uses manners c1 and c2 as examples.

Manner c1: The turn light status of the vehicle is collected by using an information collection module of the vehicle. After the vehicle starts to move, the information collection module is started to collect information about the vehicle. The information includes the turn light status of the vehicle.

After collecting the turn light status, the information collection module may transmit the turn light status to a computer system for storage, so that the turn light status of the vehicle may be stored.

Manner c2: To reduce power consumption, when the distance between the vehicle and the target intersection is less than or equal to a wake-up threshold, the information collection module of the vehicle is started to collect information about the vehicle. The information includes the turn light status of the vehicle.

The wake-up threshold is related to at least one of a solid line length of a lane in which the vehicle is currently located, a running speed of the vehicle, or a traffic congestion degree near the positioning location of the vehicle.

For example, the wake-up threshold may be a preset threshold. For example, the wake-up threshold may be set to 500 meters. Alternatively, the wake-up threshold may be determined based on the running speed of the vehicle. For example, currently, the running speed of the vehicle is lower than 30 meters/second. In this case, the wake-up threshold may be decreased. For example, the wake-up threshold may be set to 300 meters. When the running speed of the vehicle is greater than 30 meters/second and less than 60 meters/second, the wake-up threshold may be increased. For example, the wake-up threshold may be set to 800 meters.

This avoids a case in which the prompt information cannot be notified to the user in a timely manner, and the user cannot modify a driving status in a timely manner based on the prompt information.

For another example, the wake-up threshold may be determined based on the traffic congestion degree near the positioning location of the vehicle. For example, if a current traffic congestion degree is high, the wake-up threshold may be increased. If current traffic is smooth, the wake-up threshold may be decreased. For details, refer to the foregoing examples. Certainly, the wake-up threshold may be further comprehensively determined with reference to the foregoing manners. In addition, the wake-up threshold may be preset, or may be adjusted in real time based on information about a lane in which the vehicle is actually located. This is not limited herein.

Figure 4A:
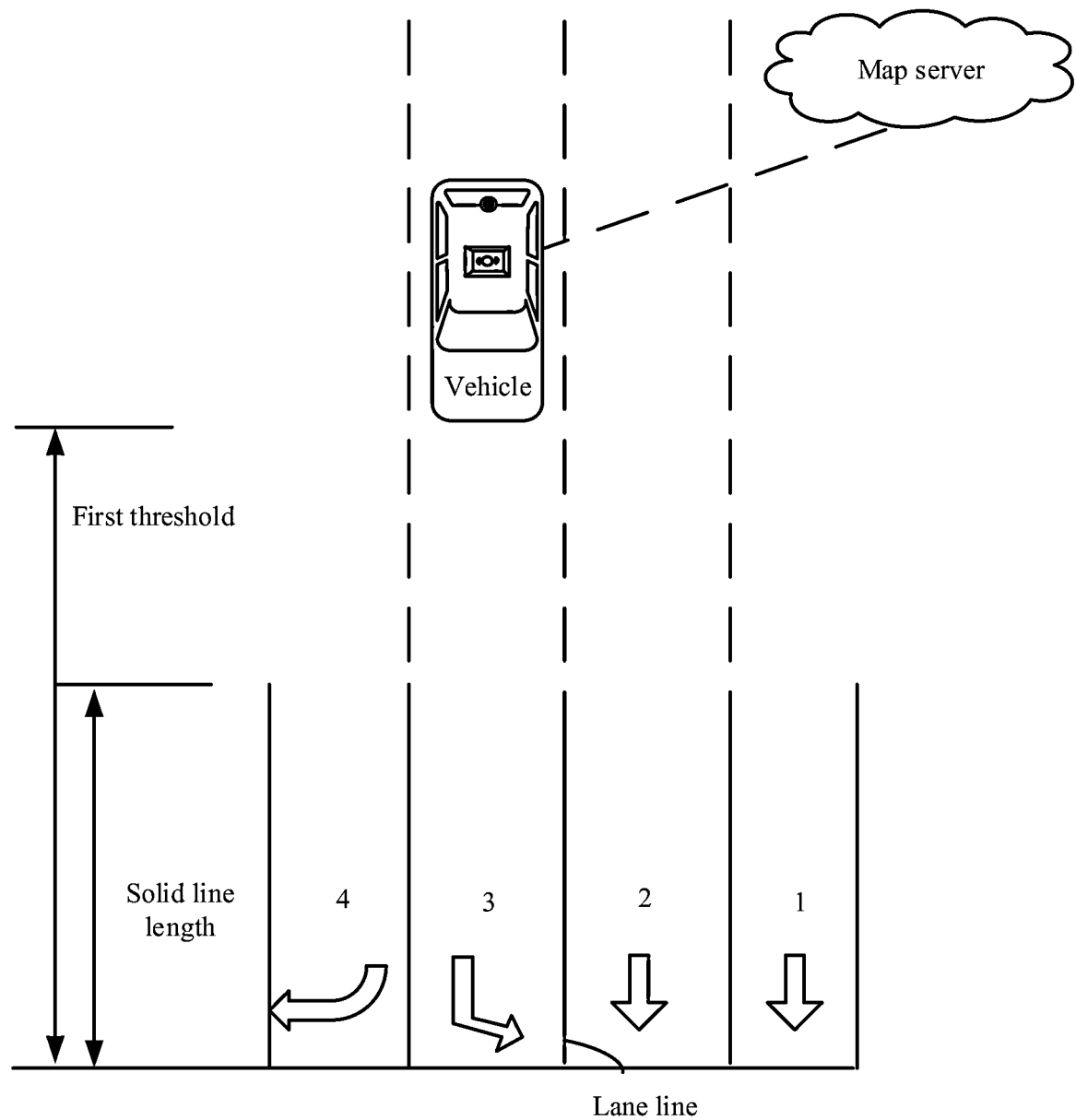
FIG. 4a to FIG. 4d are schematic diagrams of application scenarios of a reminding method in assisted driving according to an embodiment of this application.

The solid line length of the lane in which the vehicle is currently located may be determined based on information of a lane that corresponds to a lane in which the vehicle is currently located and that is determined based on a map. FIG. 4a is a schematic diagram of an application scenario according to an embodiment of this application. Indication information of turning rules of lanes is shown in FIG. 4a. There are four lanes. Driving directions of two lanes (a lane 1 and a lane 2) on the left are consistent and straight, and vehicle driving directions on two lanes on the right are left turn (a lane 3) and right turn (a lane 4). Any vehicle may be an intelligent vehicle or a non-intelligent vehicle. This is not limited in this embodiment of this application. In this case, the lane in which the vehicle is located is the third lane, and the vehicle may determine a solid line length of the third lane based on the map. For example, if the solid line length of the third lane is 10 meters, the wake-up threshold may be set to 100 meters. If the solid line length of the third lane is 20 meters, the wake-up threshold may be set to 200 meters.

Operation 304: When the distance between the vehicle and the target intersection is less than a first threshold, generate the prompt information based on the turn light status of the vehicle and a first turning rule of a first lane in which the vehicle is located at the target intersection.

The prompt information prompts that the turn light status does not conform to the first turning rule. The prompt information may include but is not limited to a voice prompt, a text prompt, an abnormal signal tone, or a warning light prompt.

The first threshold may be related to at least one of the solid line length of the lane in which the vehicle is currently located, the running speed of the vehicle, or the traffic congestion degree near the positioning location of the vehicle.

For example, the first threshold may be determined based on the running speed of the vehicle. For example, currently, the running speed of the vehicle is lower than 30 meters/second. In this case, the first threshold may be reduced. For example, the first threshold may be set to 50 meters. When the running speed of the vehicle is greater than 30 meters/second and less than 60 meters/second, the first threshold may be increased. For example, the first threshold may be set to 100 meters. This avoids a case in which the prompt information cannot be notified to the user in a timely manner, and the user cannot modify the driving status in a timely manner based on the prompt information. For another example, the first threshold may be determined based on the traffic congestion degree near the positioning location of the vehicle. For example, if the current traffic congestion degree is high, the first threshold may be increased. If current traffic is smooth, the first threshold may be decreased. For details, refer to the foregoing examples. For another example, the first threshold may alternatively be determined based on the solid line length of the lane in which the vehicle is located. For example, the first threshold may be set to a value twice the solid line length of the lane in which the vehicle is located. With reference to the example in FIG. 4a, if the solid line length of the third lane is 10 meters, the first threshold may be set to 20 meters. If the solid line length of the third lane is 20 meters, the first threshold may be set to 40 meters. Certainly, the first threshold may be further comprehensively determined with reference to the foregoing manners. In addition, the first threshold may be preset, or may be adjusted in real time based on information about the lane in which the vehicle is actually located. This is not limited herein.

In operation 304, there may be another scenario in which the prompt information is generated. The following uses scenario 1 to scenario 3 as examples.

Scenario 1: The prompt information is generated when the distance between the vehicle and the target intersection is less than or equal to the wake-up threshold.

Figure 4B:
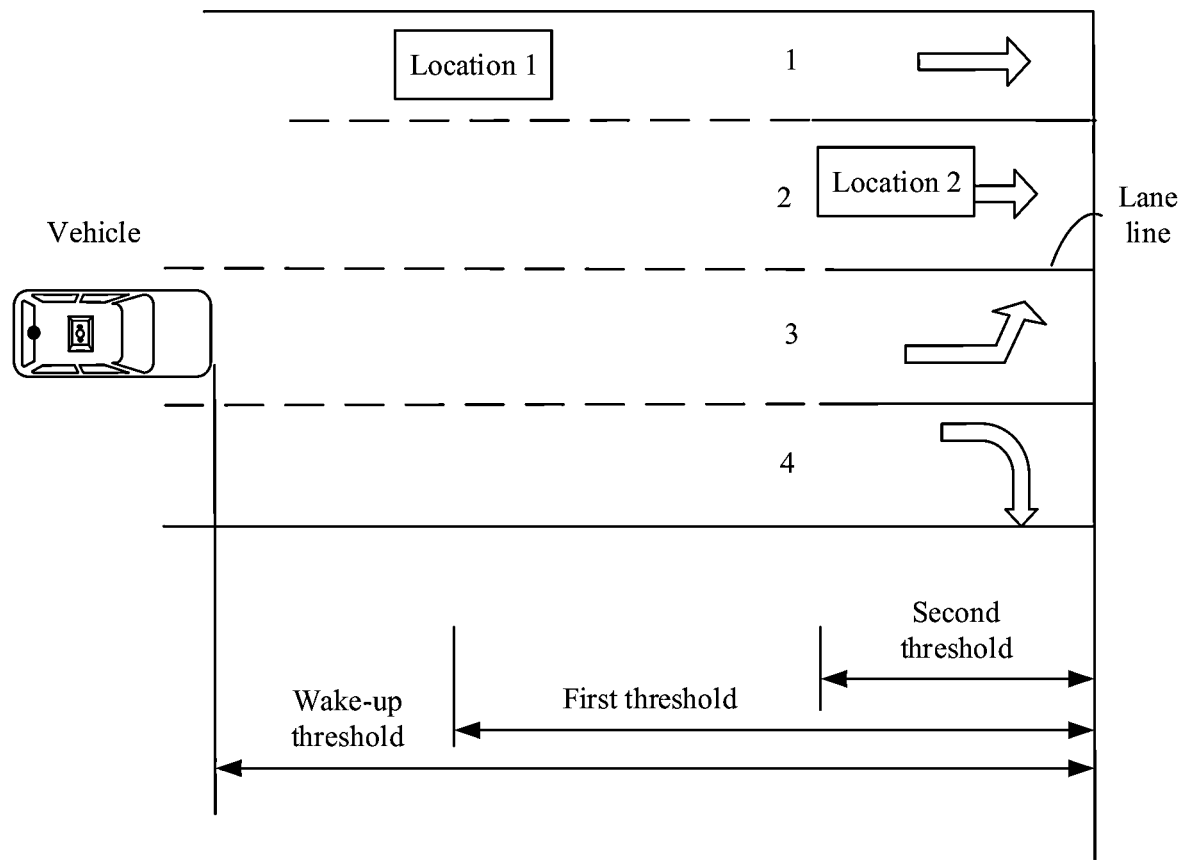

In a possible manner, when the distance between the vehicle and the target intersection is less than or equal to the wake-up threshold, the vehicle may generate the prompt information, to prompt the user of the lane information of the target intersection. This prompts the user in advance. The following uses an example in which the prompt information is voice information. A processor of the vehicle may generate the prompt information based on the first turning rule of the lane in which the vehicle is located. The prompt information may include the type of the target intersection, a quantity of lanes at the target intersection, and a turning rule corresponding to a lane at the target intersection. As shown in FIG. 4b, when the vehicle is at a current location, the prompt information may be: "The vehicle is to arrive at a crossroad. There are four lanes at the intersection. If going straight, please drive on two lanes on the left. If turning left, please drive on a third lane. If turning right, please drive on the rightmost lane." After the prompt information is generated, the prompt information is sent to a vehicle infotainment voice module. After receiving the prompt information, the vehicle infotainment voice module plays the prompt information.

Figure 4C:
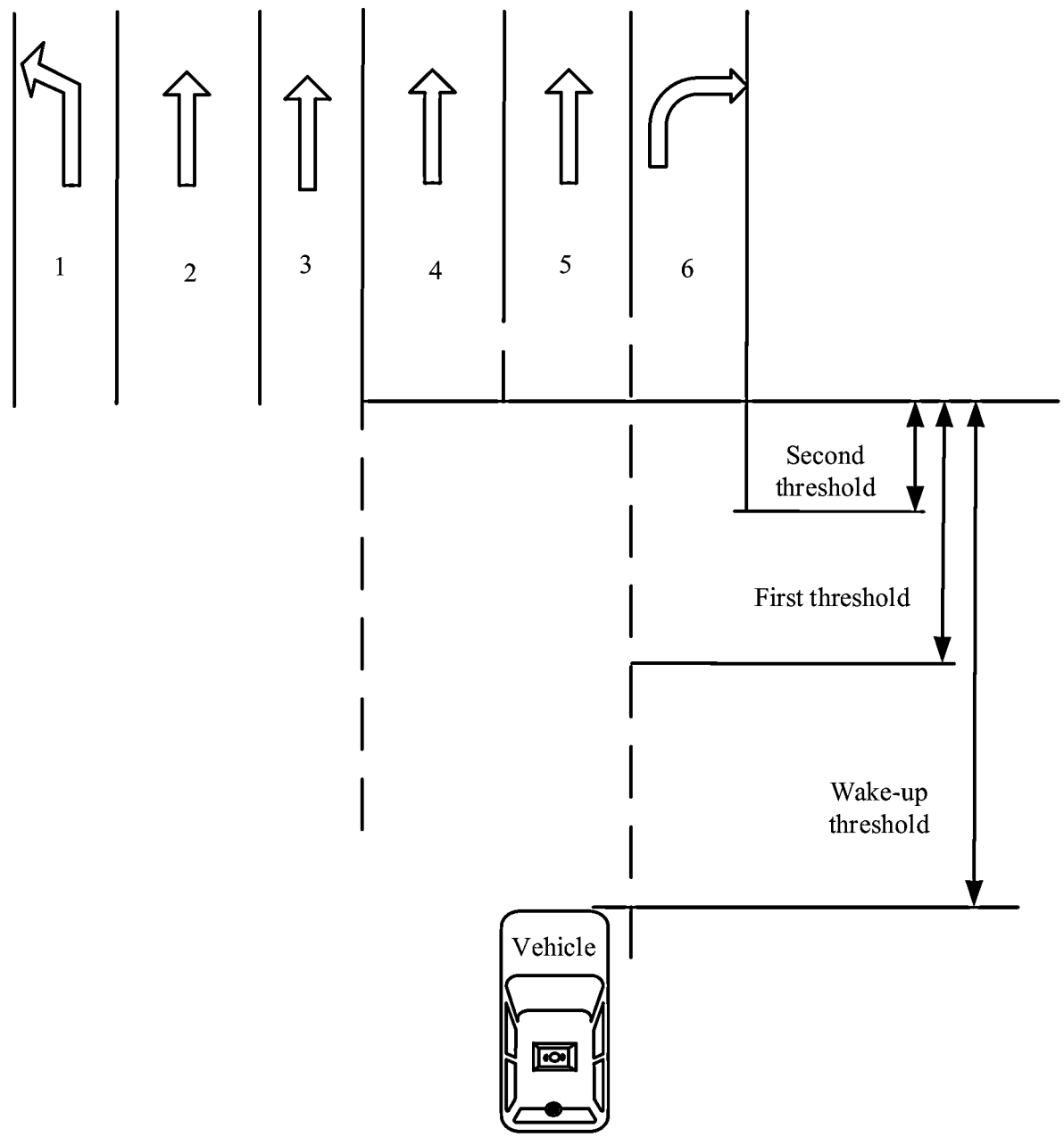

In another possible manner, it is considered that the target intersection is a non-crossroad. For example, the target intersection is an entrance and an exit of an overpass, a one-way intersection, or the like. In this case, a boundary of the lane line is different from a lane line on a road on which the vehicle is currently running, for example, a lane is added or reduced. This results that the user does not know how to drive on a road ahead. In this case, as shown in FIG. 4c, the target intersection is an entrance of the overpass. The distance between the target intersection and the vehicle may be determined based on the distance between the entrance of the overpass and the vehicle. There are six lanes at the target intersection. Two lanes in the middle are entrance lanes of the overpass. Straight lanes of an auxiliary road are the third lane and the fifth lane. A left turn lane of the auxiliary road is the leftmost lane, and a right turn lane is the rightmost lane. In this case, generated prompt information may be: "The vehicle is to arrive at an entrance of an overpass. There are six lanes on a road ahead. If going to the overpass, please drive on the two lanes in the middle. If going to an auxiliary road, please drive on a third lane and a fifth lane. If turning left on the auxiliary road, please drive on the leftmost lane. If turning right, please drive on the rightmost lane".

Scenario 2: When the distance between the vehicle and the target intersection is less than the first threshold and greater than a second threshold, a distance between the vehicle and a solid line of the target intersection is long, or there are few vehicles waiting from a stop line at the target intersection, or there are few other vehicles move around the vehicle. In this case, the vehicle has enough time and distance to change a lane.

In an embodiment, the prompt information is further used to prompt the vehicle to change from the first lane to a second lane, and the turn light status meets a second turning rule of the second lane at the target intersection, where the second threshold is less than the first threshold.

For example, with reference to FIG. 4b, the current location of the vehicle corresponds to the third lane. When it is determined that the turn light status of the vehicle is the straight state and inconsistent with a turning rule (left turn) of a current lane in which the vehicle is located, the user may be prompted with the turning rule of the current lane, the user may also be prompted with a lane whose status is consistent with the turn light status. For example, the prompt information may be: "The lane in which the vehicle is located is a left turn lane. If going straight, please drive on the two leftmost lanes", to prompt the driver to change the lane in a timely manner. When it is determined that the left turn light of the vehicle is turned on, reminding may be ended. When it is determined, by obtaining the current driving location of the vehicle, that the current lane of the vehicle is updated to a lane 1 or a lane 2, it is determined that the vehicle needs to go straight, and this lane change operation may be recorded. The prompt information and lane changing behavior of the vehicle may be reported to the server or stored in the vehicle. When the vehicle passes the location next time, if it is determined that the vehicle still moves to the third lane, a reminder may be sent to the driver based on the prompt information, to remind the driver to drive on the two leftmost lanes if going straight. This avoids a case in which the driver needs to go straight but does not drive on the straight lane in advance at the intersection. Therefore, driving experience may be improved and a possible safety risk may be avoided.

In another embodiment, a current turn light status may be a short-time left turn state or a short-time right turn state. The short-time left turn is used as an example. When it is determined that the turn light status of the vehicle is inconsistent with the turning rule of the current lane in which the vehicle is located, for example, the current lane in which the vehicle is located is a straight lane, the user may be prompted to drive in the left turn lane. The prompt information may be: "The vehicle is in a straight lane. If turning right, please drive on the third lane." Further, if the vehicle moves to the left turn lane and the short-time left turn state ends, the user may be further prompted that the current lane is the left turn lane and the left turn light needs to be turned on. The prompt information may be: "The vehicle is on a left turn lane. Please turn on the left turn light."

In still another embodiment, the short-time left turn is used as an example. A current turn light status is a short-time left turn state, and the turn light status of the vehicle is consistent with the turning rule of the current lane in which the vehicle is located, that is, the current lane in which the vehicle is located is a left turn lane. However, based on a driving path of the vehicle, it may be determined that the vehicle does not currently turn left, and is still going straight. A possible reason is that the user accidentally toggles the control of the turn light. In this case, the vehicle may further generate prompt information. The prompt information may be "A current lane of the user is a left turn lane. If going straight, please drive on two lanes in the middle".

Scenario 3: Considering that the vehicle may move in a location range corresponding to a solid lane area of the lane, or is to move in a location range in which a lane may not be changed due to a traffic congestion of a current road, to avoid a problem that the vehicle violates a traffic rule or causes a security risk during driving, when the distance between the vehicle and the target intersection is less than the second threshold, the prompt information may be sent. The prompt information may be used to prompt that the vehicle passes the target intersection from the first lane based on the first turning rule.

Figure 4D:
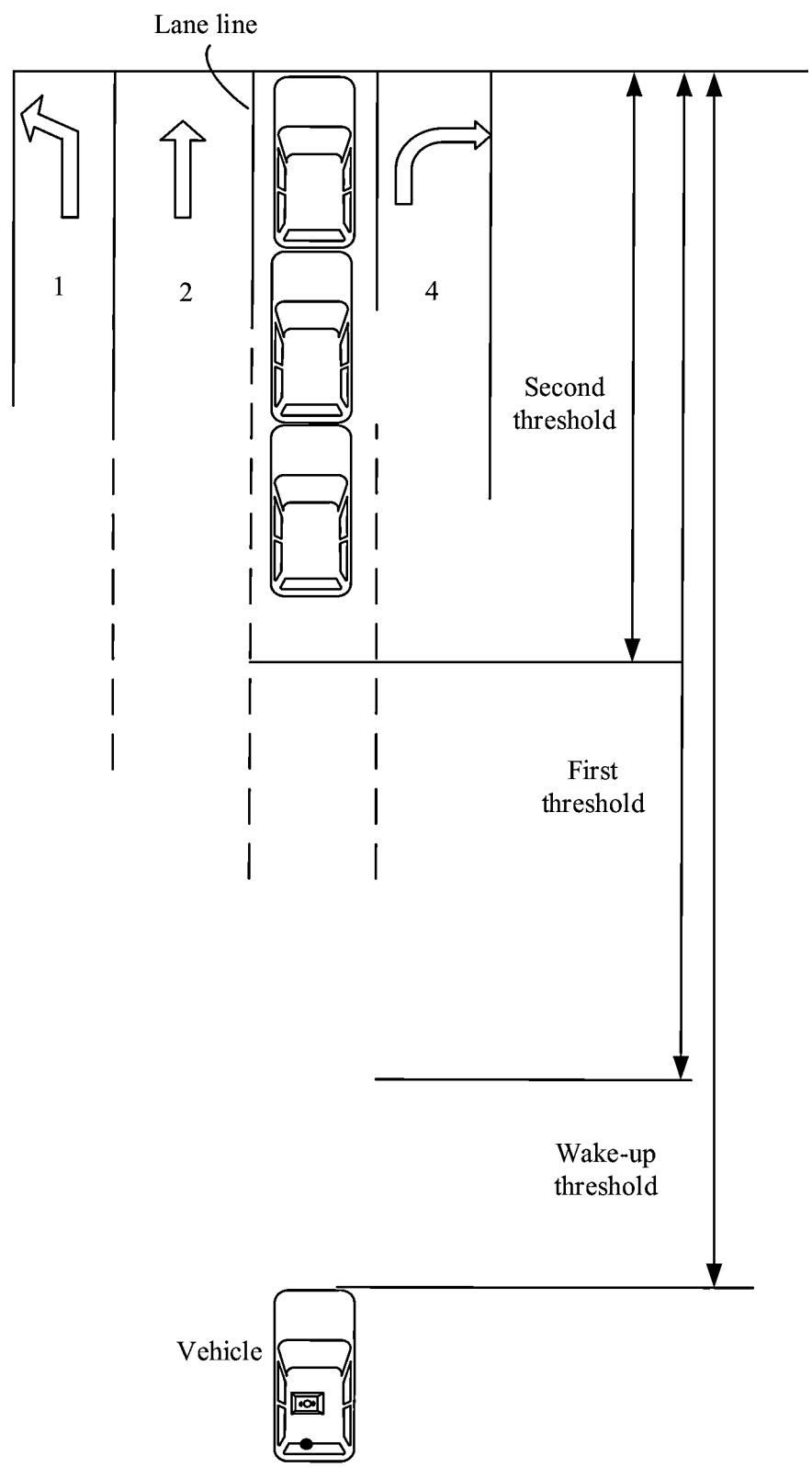

For example, the second threshold may be the solid line length of the lane in which the vehicle is located. For example, if a solid line length of the current lane in which the vehicle is located is 10 meters, it is determined that the second threshold is 10 meters. Alternatively, the second threshold may be comprehensively determined based on one or more of the running speed of the vehicle or the traffic congestion degree near the positioning location of the vehicle. For example, if the vehicle congestion degree at a current positioning location of the vehicle is high, and a location at which a waiting vehicle in front of the vehicle is located exceeds the solid line length of the lane, as shown in FIG. 4d, the second threshold may be determined based on the location of the waiting vehicle. That is, the second threshold is less than the first threshold. The second threshold is related to at least one of a solid line length of the first lane, the running speed of the vehicle, or the traffic congestion degree near the positioning location of the vehicle. For a specific manner of setting the second threshold, refer to the manners of setting the wake-up threshold and the first threshold. Details are not described herein again.

In this scenario, the prompt information may be: "The current lane in which the vehicle is located is a straight lane. Turn on a right turn signal light of the vehicle, and prohibit to changing a lane. The current lane only allows going straight, please do not turn right, and please turn off the right turn signal light." Alternatively, the prompt information may be: "The current road is congested, and the vehicle is to drive in a solid line area. Please go straight, and turn off the right turn signal light."

After the prompt information is output, in response to an operation on the control of the turn light of the vehicle, it is determined whether the turn light status of the vehicle is consistent with the turning rule of the current lane. If the turn light status of the vehicle is inconsistent with the turning rule of the current lane, the prompt information may be output again. If the turn light status of the vehicle is consistent with the turning rule of the current lane, prompt information may be further generated for the user based on a road on which the vehicle is to move after the vehicle passes the intersection. For example, the prompt information may be "Go straight ahead, and drive in XX road." Further, considering that the user temporarily changes the driving route, the driving route may be different from an expected driving direction, for example, the expected driving direction is right turn, in this case, the user may pay attention to only a traffic light of a right turn, but may not pay attention to a traffic light of a current straight lane, the user may run a red light. Therefore, when it is determined whether the turn light status of the vehicle is consistent with the turning rule of the current lane, the prompt information may be further generated. The prompt information indicates a traffic light status of a current straight lane. For example, the prompt information may be: "A traffic light of a current straight lane is on red (on yellow, or going to turn red). Pay attention to slowing down or stopping."

Figure 4E:
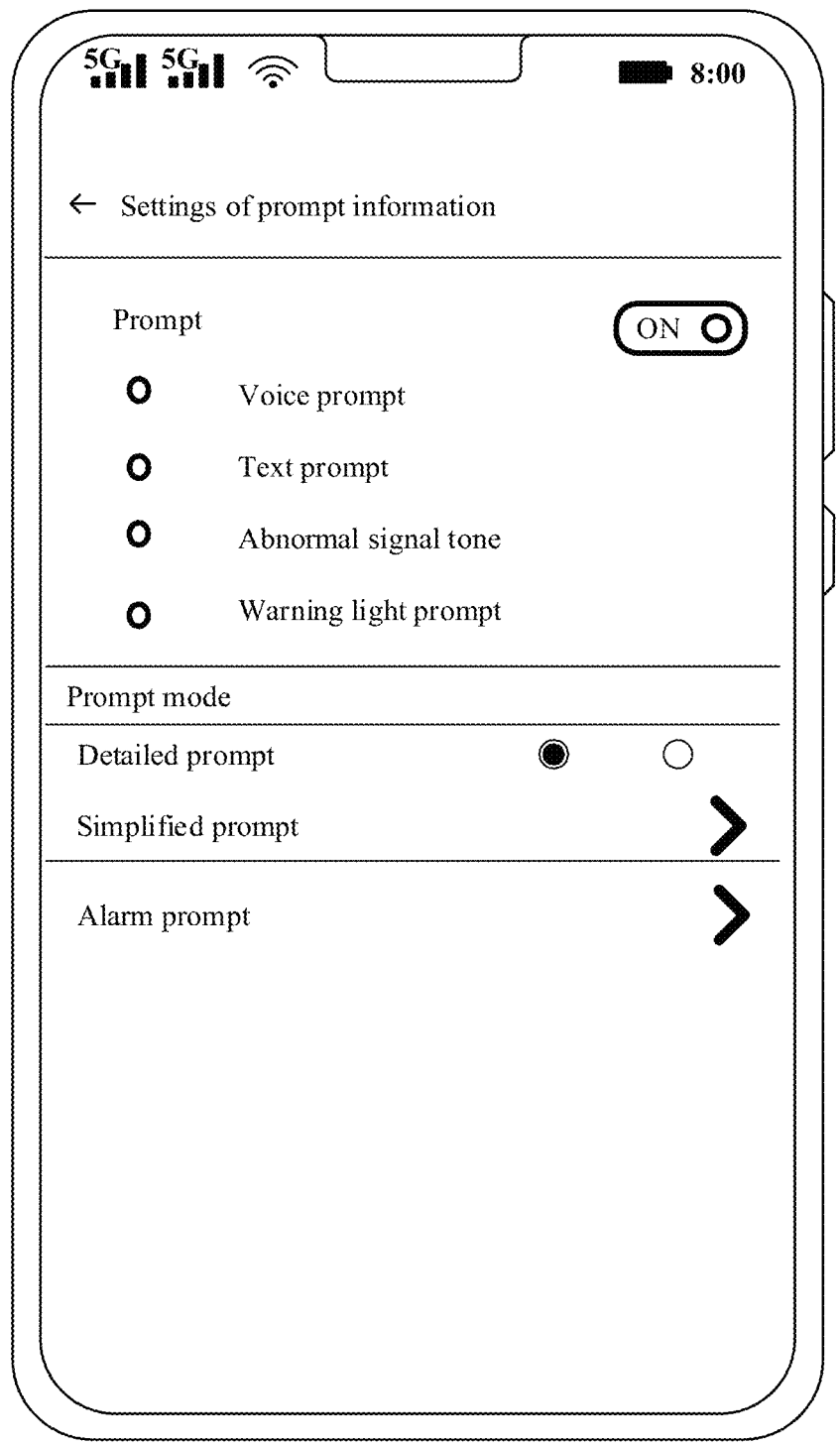
FIG. 4e is a schematic diagram of a setting interface of prompt information according to an embodiment of this application.

It should be noted that time of generating the prompt information may also be determined based on a reminder habit set by the user. For example, an example in which the vehicle is used as output of the prompt information is used. A user interface of the vehicle may include a personalized setting interface, and the setting interface may include a setting manner of the prompt information. For example, as shown in FIG. 4e, the setting interface may include a selection of a type of prompt information, for example, a voice prompt, a text prompt, an abnormal signal tone, or a warning light prompt. The setting interface may further include a prompt information mode, for example, a detailed prompt mode, a simplified prompt mode, or an alarm prompt mode. A specific prompt mode may further include a detailed setting interface. In the detailed prompt mode, the vehicle may generate prompt information when the distance between the vehicle and the target intersection reaches the wake-up threshold, the first threshold, or the second threshold, and output the prompt information to the user in a timely manner. The prompt information may include detailed information about the target intersection. Further, when it is determined that the vehicle is still not corrected in a timely manner, that is, the turn light status of the vehicle is inconsistent with the first turning rule of the first lane in which the vehicle is located at the target intersection, the prompt information is output again, to remind the user to adjust the turn light status or adjust the lane in which the vehicle is located. After the turn light status of the vehicle is consistent with the first turning rule of the first lane in which the vehicle is located at the target intersection, the prompt information does not need to be output. Certainly, in this manner, the prompt information may be output only for N times (for example, three times), to avoid a case in which driving safety of the driver is reduced due to outputting of the prompt information for a plurality of times and interference with other information.

In the simplified prompt mode, the prompt information is generated when the distance between the vehicle and the target intersection reaches the first threshold or the second threshold. Further, the prompt information may be output only once after being generated, regardless of whether the turn light status of the vehicle is consistent with the first turning rule of the first lane in which the vehicle is located at the target intersection.

In the alarm prompt mode, the prompt information is generated when the distance between the vehicle and the target intersection reaches the second threshold. That is, the prompt information includes only prompt information indicating that a violation is to occur. For example, the vehicle currently drives in the solid line area and cannot change the lane, or has moved out a stop line of the lane. In this case, if the turn light status of the vehicle is consistent with the first turning rule of the first lane in which the vehicle is located at the target intersection, a violation is to occur, and alarm information needs to be generated.

This application provides a map generation method. The map generation method provided in this application may be performed by a vehicle, a terminal device, or a cloud server.

The server is used as an example. Prompt information may be generated by using the server, so that the server generates first information based on the prompt information and a positioning location of a vehicle, and records a target lane at a target intersection as a turning violation-prone lane. The first information may be stored on a map based on the positioning location. The first information may be stored as a type of lane information, for example, as attribute information of a type of lane information. Alternatively, a layer may be separately generated for the first information. When a terminal device or the vehicle needs to view or use the first information, a map server may send the first information to the terminal device or the vehicle.

The vehicle is used as an example. After generating the prompt information, the vehicle may generate the first information based on the prompt information and the positioning location of the vehicle, and records the first lane at the target intersection as a turning violation-prone lane. The first information may be stored in a map module of the vehicle. When the vehicle needs to view or use the first information, the vehicle may invoke the first information from the map. To reduce occupation of vehicle storage space, in an embodiment, the first information may not include specific content of the prompt information, for example, may not include a turning rule of the target lane, or is only abstract information. When the first information needs to be viewed or used, the vehicle may request the specific content of the prompt information from the server.

Figure 5A:
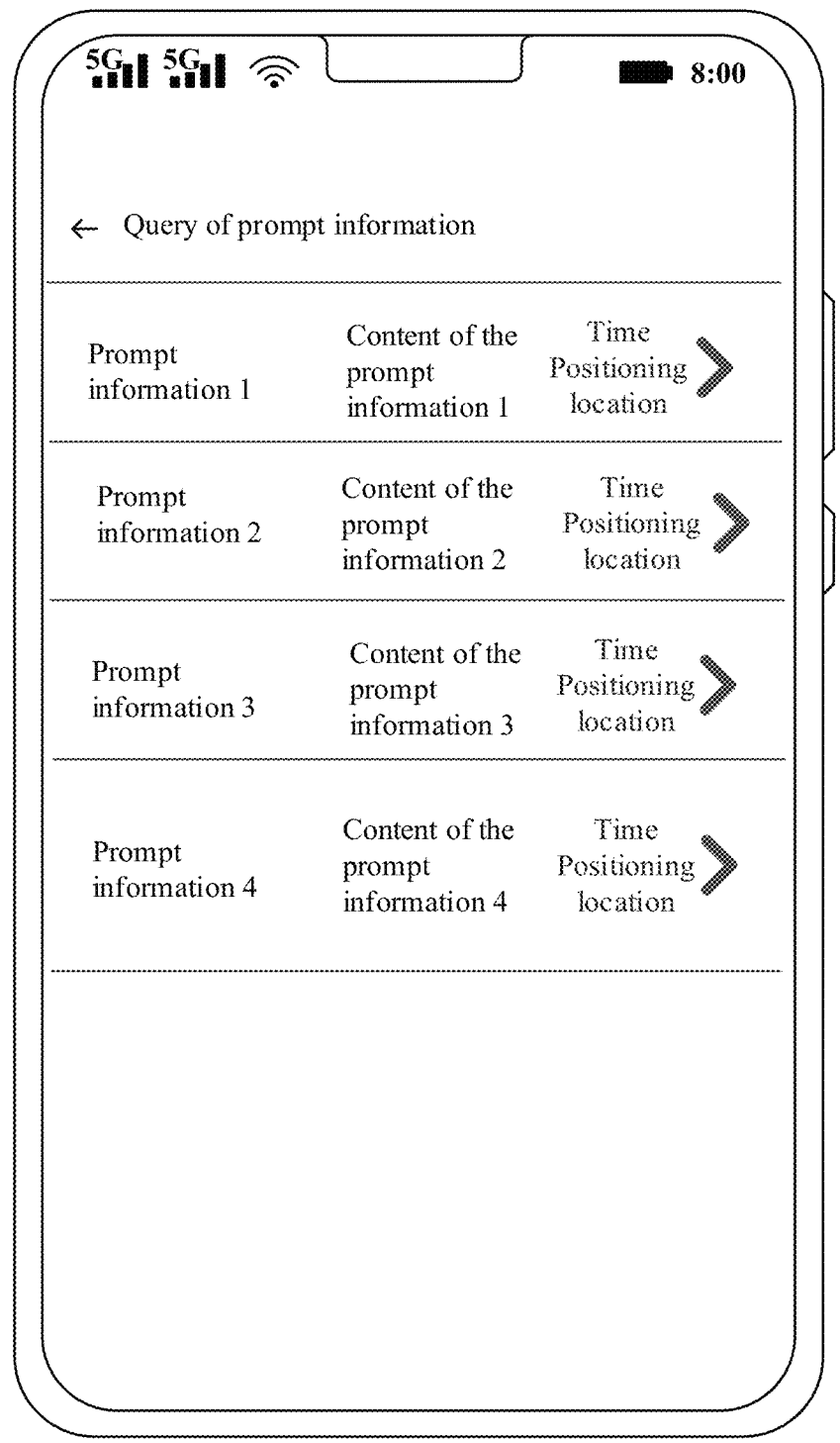
FIG. 5a is a schematic diagram of a query interface of prompt information according to an embodiment of this application.
Figure 5B:
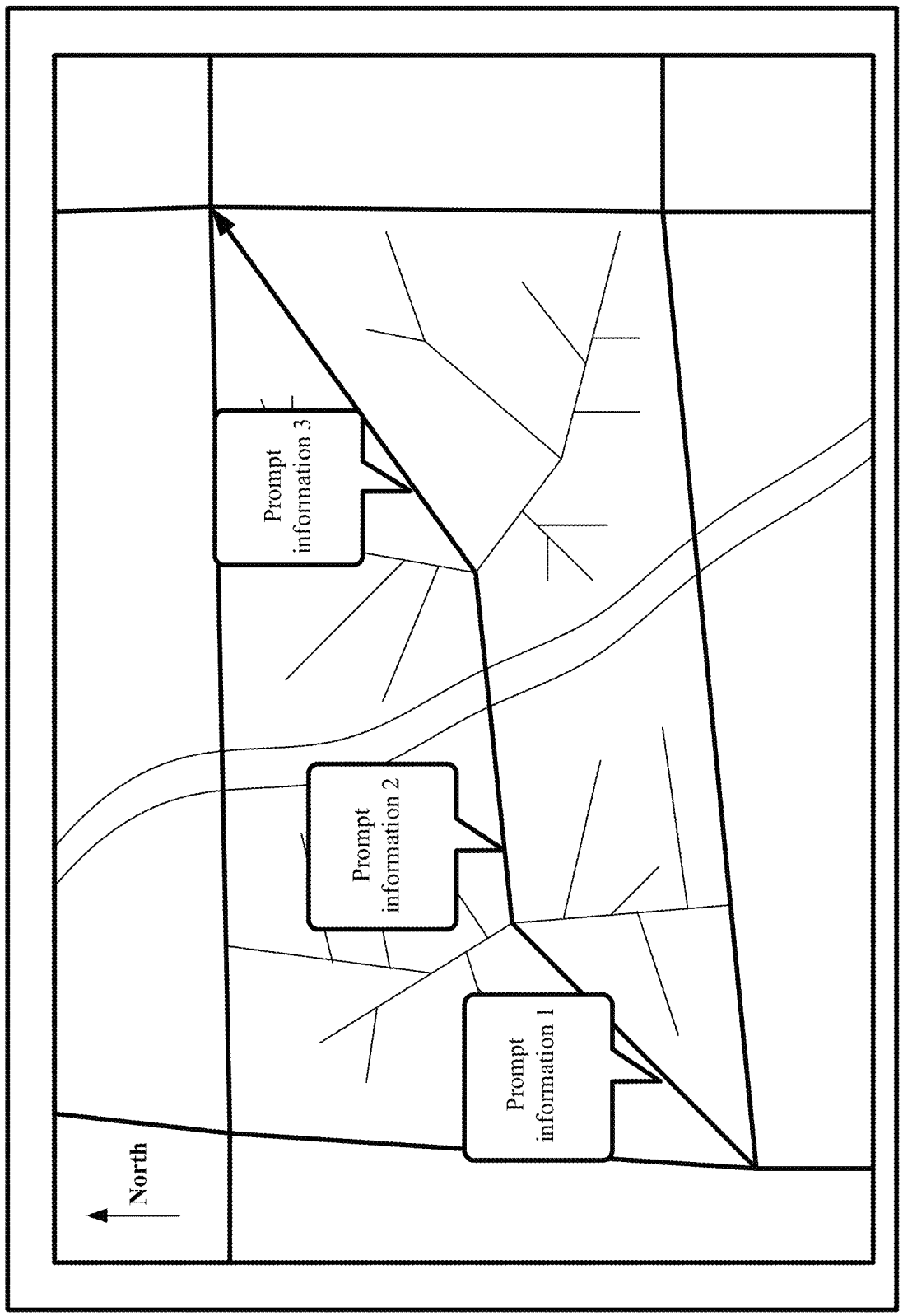
FIG. 5b and FIG. 5c are schematic diagrams of a display interface of prompt information according to an embodiment of this application.

The terminal device is used as an example. After the terminal device receives the prompt information shown in FIG. 3, the terminal device may generate the first information based on a positioning location of the terminal device and the prompt information, and store the first information in a corresponding application (for example, a navigation application, a map application, or a vehicle-related application). Alternatively, the prompt information may be sent to the server or the vehicle. Further, when a user needs to view the prompt information, for example, when the user opens a related application, the user may view the prompt information by querying historical prompt information. FIG. 5*a* shows a query interface of a vehicle application of the terminal device. A query control with the prompt information may be displayed on the query interface, and in response to the query control for querying the prompt information, the terminal device sends a query request to the server. The query request may be prompt information for querying a road section, prompt information for querying a period of time, prompt information in a driving process, or prompt information for querying all pieces of historical prompt information. This is not limited herein. The server returns a query response to the terminal device, or invokes prompt information stored in the terminal device to obtain the prompt information. After the terminal device obtains the prompt information, a query result may be displayed on the query interface. For example, the obtained prompt information of a period of time may also be prompt information in a road section, or may be prompt information in a driving process. For example, as shown in FIG. 5*b*, prompt information of a corresponding road section may be displayed in a navigation state. For example, the prompt information on a corresponding road section may be displayed when the vehicle approaches the road section, or all pieces of prompt information on a navigation path may be displayed. This is not limited herein. A display mode may be displayed based on a selection of the user. For example, a setting control of the display mode may be displayed on the query interface. The display mode, for example, time period display, map display, or quantity display of driving times, may be selected by using the control. The obtained prompt information may be displayed based on the display mode selected by the user.

Figure 5C:
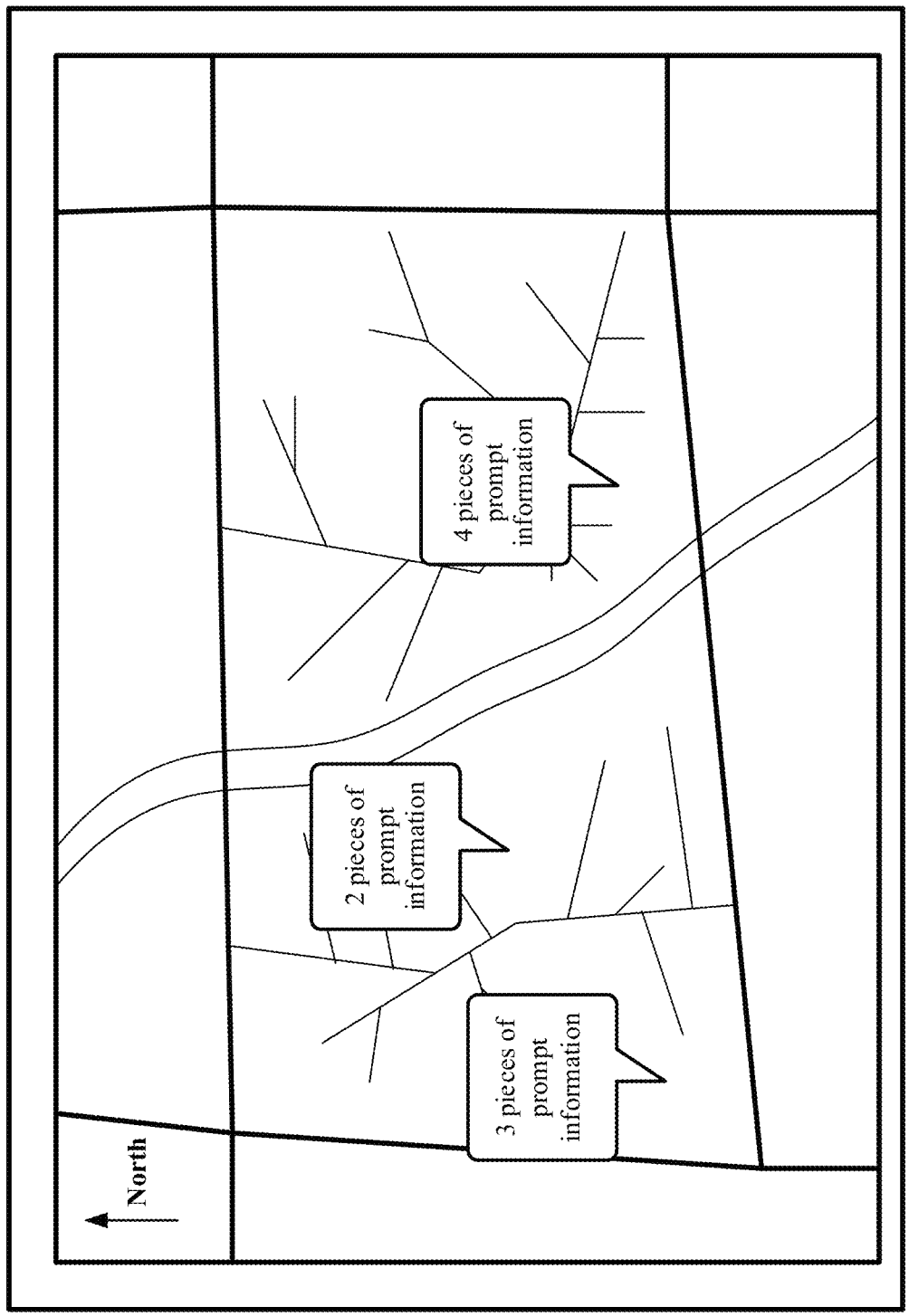

Alternatively, when the user opens the map application, on the map, the prompt information may be displayed on a map interface in a form of additional information. For example, as shown in FIG. 5*c*, the additional information includes only a quantity of pieces of prompt information existing at the location, for example, "3 pieces of prompt information", "2 pieces of prompt information", "4 pieces of prompt information", and the like, to prompt the user that there is historical prompt information at the corresponding location. The user may tap the additional information, and in response to an operation of tapping the additional information by the user, specific content of all prompt information in the area may be viewed. Based on the additional information, the user may select a path without prompt information, change a driving path, or set a prompt of the turning rule of the lane for the user when the vehicle passes the location. Further, if the application is a navigation application, reminder information may be further generated based on the prompt information. For example, when it is determined that a current navigation path passes a location corresponding to the prompt information, the reminder information may be sent to the user, to remind the user whether to change the navigation path.

Considering that there may be a large quantity of pieces of prompt information, the generated prompt information of the first lane may be a plurality of pieces of prompt information generated based on the lane and the vehicle, or may be one piece of first information that is comprehensively generated. For example, the first information records a first lane at a target intersection as a turning violation-prone lane, to reduce occupation of storage space.

Another reminding method in map-assisted driving provided in this embodiment of this application includes the following operations. A map provided in this embodiment of this application is a map including first information, and the first information is generated based on prompt information.

An execution body of the another reminding method in map-assisted driving provided in this application may be a vehicle, a terminal device, or a cloud server. For example, the prompt information may be generated by using the server, so that the server generates the first information based on the prompt information and positioning information of a vehicle, and generates personalized reminder information based on the first information determined in a historical period of time. The reminder information may be sent to the vehicle when the vehicle arrives at a positioning location next time, and the vehicle outputs the reminder information, to remind the user that a turning error behavior occurs at the location last time. Therefore, the user may avoid recurrence of the problem. Further, the personalized reminder information may be generated based on prompt information that is generated based on a same positioning location of a plurality of vehicles. The reminder information may remind the user that a current location is a violation-prone lane, and remind the user to drive according to a turning rule of the lane.

In another embodiment, in the another reminding method in map-assisted driving, the prompt information may be further generated by the vehicle, and the personalized reminder information may be generated based on prompt information determined in a historical period of time and a positioning location of the vehicle corresponding to the generated prompt information. The vehicle outputs the reminder information.

In still another embodiment, in the another reminding method in map-assisted driving, the prompt information may be generated by the vehicle. The first information is generated based on the prompt information, and sent to a cloud map server. The cloud map server provides the personalized reminder information for the vehicle based on the received first information, and sends the personalized reminder information to the vehicle. The vehicle outputs the reminder information, to improve driving experience. The following uses an example in which the execution body is the terminal device 101. A navigation application or a map application may be installed in the terminal device 101. The terminal device 101 may communicate with a back-end map server through the internet by using the navigation application or the map application. The terminal device 101 may display a navigation track and the reminder information on a navigation interface based on a navigation map, a destination input by the user, a positioning location of a terminal, and the obtained reminder information, to optimize a navigation function.

Figure 6:
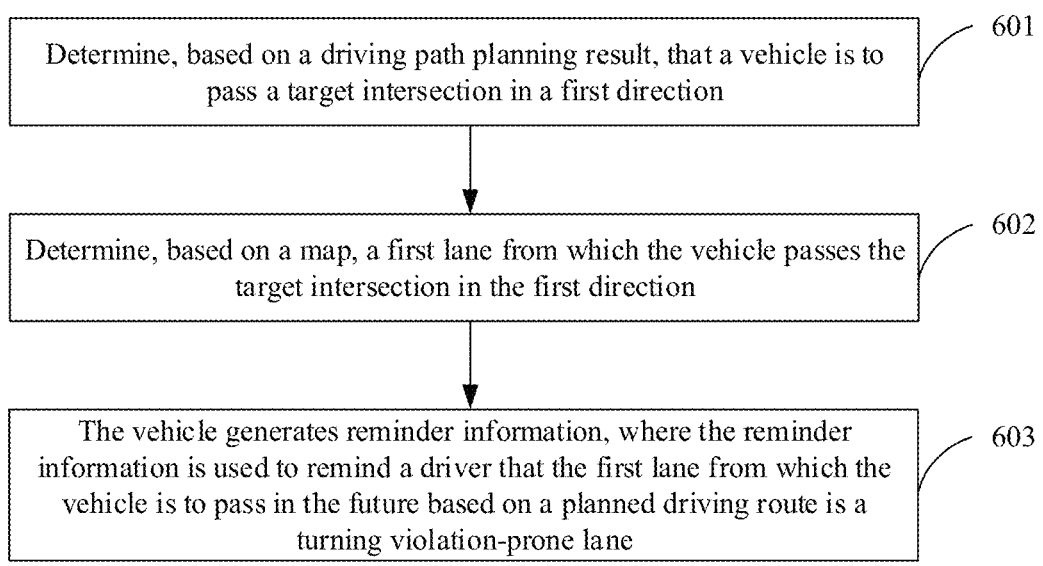
FIG. 6 is a schematic flowchart of another reminding method in map-assisted driving according to an embodiment of this application.

The following uses an example in which the execution body is a vehicle. For another execution body, refer to a manner of the vehicle for implementation. Details are not described herein again. As shown in FIG. 6, the method may include the following operations.

Operation 601: A vehicle determines, based on a driving path planning result, that the vehicle is to pass a target intersection in a first direction.

The driving path planning result may be a to-be-go destination input by the user in the user interface in FIG. 2. The navigation map module queries road topology data of the navigation map with reference to a current location of the user and the to-be-go destination input by the user, and determines, with reference to current lane information provided by a high definition map module, at least one driving path on which the user may arrive at the destination from the current location (referred to as a departure place below). A driving planning module or a processing chip in the driving planning module may present a lane-level driving mode icon and a road-level driving mode icon on the user interface. For example, the navigation map module may provide a plurality of driving paths from a departure place to a destination of the vehicle. In this case, the navigation map module may first determine candidate driving paths; in the candidate driving paths, determine, based on a current positioning location of the vehicle, a time, and a distance length of the candidate driving paths; and determine the driving path planning result based on a requirement of the user.

After the driving path planning result is determined, it may be determined, based on the driving path planning result, whether the vehicle passes the target intersection when the vehicle plans to drive based on the driving path. The target intersection may be a target intersection from which the vehicle or another vehicle passes in a historical driving process. In addition, in a process of passing the target intersection, prompt information indicating that a turn light status is inconsistent with the turning rule of the target intersection is generated. The following uses an example in which the vehicle stores a high definition map including the first information. The vehicle may compare the positioning location of the vehicle stored in the first information with the driving path planning result, to determine whether the driving path planning includes the target intersection and whether a driving direction of the vehicle is a first direction recorded in the first information, that is, whether the driving direction of the vehicle is the same as the driving direction of the vehicle in the first information.

Operation 602: The vehicle may determine, based on the high definition map, a first lane in which the vehicle passes the target intersection in the first direction.

The first lane is one of at least one turning violation-prone lane recorded in the first information on the high definition map. After determining the target intersection, the vehicle may determine the at least one turning violation-prone lane based on the first information that is generated when the vehicle passes the target intersection in the first direction.

With reference to FIG. 4b, for example, based on the determined first information of the target intersection, it may be determined that the first lane and the second lane are violation-prone lanes. Prompt information corresponding to the first lane is: "A current lane is a left turn lane. Please change a lane in advance." The prompt information is generated at a location 1. Prompt information corresponding to the second lane is: "A current vehicle has driven in a solid line area. The lane is a straight lane. To avoid violation, go straight and turn off the turn light." The prompt information is generated at a location 2.

Operation 603: The vehicle generates the reminder information, where the reminder information reminds a driver that the first lane in which the vehicle is to pass in the future based on a planned driving route is a turning violation-prone lane.

Considering that the planned driving route passes the target intersection in the first direction, the reminder information may be generated when the vehicle is to arrive at the target intersection.

With reference to the foregoing example, when the vehicle is to arrive at the target intersection, the reminder information may be generated based on prompt information at the location 1 and the location 2. The reminder information may be: "Attention! There is a turning violation-prone lane at an intersection ahead."

For another example, when the vehicle arrives at the location 1, the reminder information may be generated based on the prompt information at the location 1. For example, the reminder information may be: "Attention! A first lane at an intersection ahead is a left turn lane." Further, the reminder information may be generated based on the prompt information. For example, the reminder information may further include: "A current lane is a left turn lane. If turning left, please change a lane in advance." For another example, when the vehicle arrives at the location 2, the reminder information may be generated based on the prompt information at the location 2. The reminder information may be: "A current lane is a straight lane. A vehicle has driven in a solid line area. Please go straight."

The embodiment shown in FIG. 6 may be applied to a plurality of scenarios. For example, before departing to a destination, a driver may plan and select a driving path by using a map in navigation software. Therefore, when the navigation software presents a path planning result, a turning violation-prone intersection and lane may be reminded. For another example, when the user performs a real-time navigation while the vehicle is running, and when the navigation software performs a real-time path planning, the navigation software may remind the user of a violation-prone lane in real time based on a real-time path planning result and the first information on the map.

Considering that the driver has different familiarity with the route, when the driver is familiar with the route, if the prompt information for the driver is generated based on all users, excessive invalid reminders may be generated. This reduces driving experience of the driver. Therefore, in this embodiment of this application, the reminder information may be further personalized for each driver.

In an embodiment, the first information on the map may further include historical user identity information. The identity information of the historical user includes at least one of a first identifier of a vehicle or first identity information. For example, the user identity information may be the identifier of the vehicle, and the user or a vehicle corresponding to the identity information of the historical user may be a user or a vehicle that has a turning violation risk when passing the target intersection from the first lane and generates the prompt information.

Therefore, after the vehicle obtains the current user identity information, the vehicle may generate the reminder information based on a result of consistency comparison between the identity information of the current user and the identity information of the historical user. The identity information of the current user may include at least one of the first identifier of the vehicle or the identity information of the current driver of the vehicle. The following uses manner d1 to manner d3 as examples.

Manner d1: The user identity information is a first identifier of a vehicle, for example, sequence code of the vehicle or identification information registered by the vehicle on a corresponding application. In this case, the vehicle may determine, based on the identity information of the historical user in the first information on the map, first information corresponding to the user identity information, to generate the reminder information only for the vehicle.

Manner d2: The user identity information is user-based identity information registered on an application of a vehicle, so that the vehicle may obtain, based on the map, the first information corresponding to the identity information.

Manner d3: The user identity information is identity information registered on an application of a vehicle by using identity information of the driver. Therefore, the vehicle may obtain, based on a map, first information corresponding to the driver. This is not limited to first information on one vehicle, so that personalized reminder information may be provided for the driver.

In another embodiment, considering that there may be a plurality of navigation paths planned by the navigation module, the navigation map module may sort congestion degree of K paths and a quantity of pieces of first information existing on the paths based on corresponding lane-level road information on the K paths, to determine driving comfort degree of the K paths and calculate the K paths. For example, the navigation map module may determine, based on road types, curvatures and slopes of lanes, and current weather and traffic flow data of sub-paths on the K paths, a highest vehicle speed, an average vehicle speed, and a frequency of acceleration and deceleration of the sub-paths on the K paths, to determine congestion degree of a path, and further determine, based on the quantity of pieces of first information on the path, a path on which a driving error may occur. Further, the K paths may be screened based on the foregoing information. The following uses an example in which the K paths are four paths. If the paths are sorted based on a passing time length, a passing time length of a first path is 10 minutes, a passing time length of a second path is 9 minutes, a passing time length of a third path is 9 minutes, and a passing time length of a fourth path is 8 minutes. If the paths are sorted based on a quantity of pieces of first information appearing on the paths, a quantity of pieces of first information appearing on the first path is 1, a quantity of pieces of first information appearing on the second path is 2, a quantity of pieces of first information appearing on the third path is 1, and a quantity of pieces of first information appearing on the fourth path is 1. In this case, it may be obtained that driving comfort degree of the four paths are sorted as follows: the fourth path, the third path, the second path, and the first path. Therefore, the fourth path may be recommended to the user, and the reminder information is generated. The reminder information reminds the user that the fourth path has less time and a few violation-prone roads, and recommend driving on this path. The reminder information may be generated before the vehicle starts to move and begins to plan a path, or may be updated in real time when the vehicle is running. This is not limited herein.

It is considered that the vehicle does not drive according to a path planned by the navigation software when the vehicle is running. For example, the vehicle does not change the lane in a timely manner due to a reason, for example, a road is congested, or a turning sign of a lane is blocked, or the vehicle does not drive in a specified lane due to a reason, for example, a sign of a lane is updated, resulting that the vehicle yaws or has yawed.

Based on the foregoing problem, in this embodiment of this application, if the navigation map module determines, based on the first information and the navigation path on the map, that there is a violation-prone lane in the navigation path, the navigation map module may update the driving path based on the determined first information of the violation-prone lane, current location information of the vehicle, and the destination, to reduce impact of a yaw.

The map module determines that the lane in which the vehicle is located is the lane 1, and the lane 1 is a left turn lane. The map module may determine, based on the navigation path, that the vehicle goes straight on the current road. Therefore, the map module may determine that if the vehicle continues to moves on the current lane, the vehicle has a high probability of moving in the left turn lane when passing the intersection, resulting that the vehicle yaws. In a scenario in which the vehicle yaws because the vehicle moves in an incorrect lane, the vehicle may determine whether the yew is related to a factor, for example, whether the vehicle is allowed to change the lane at a possible yaw location.

Figure 7A:
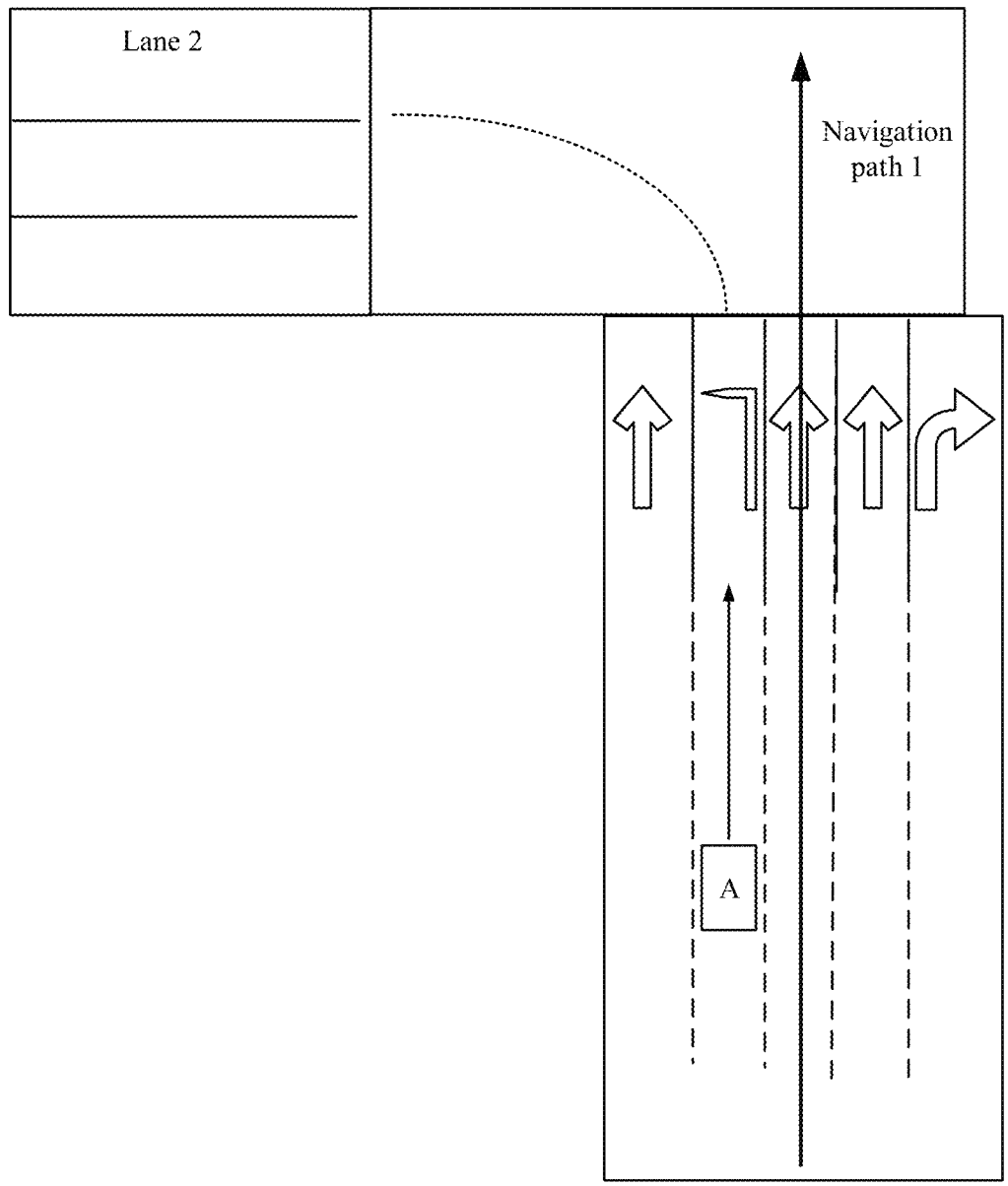
FIG. 7a and FIG. 7b are schematic diagrams of application scenarios of another reminding method in map-assisted driving according to an embodiment of this application.
Figure 7B:
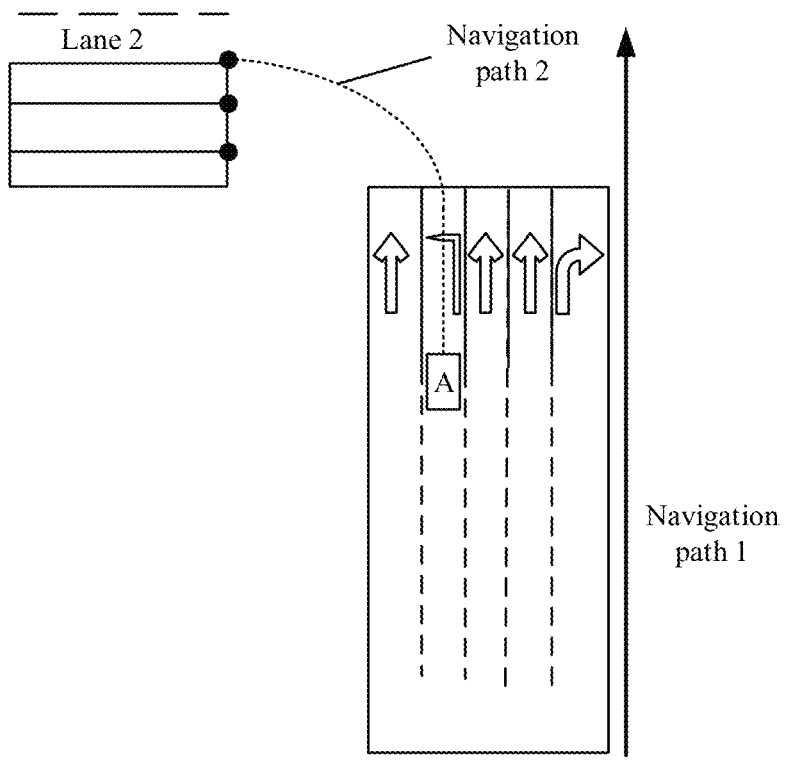

For example, as shown in FIG. 7a, the vehicle is allowed to change the lane at a location of the vehicle, that is, the vehicle may change from the left turn lane to a straight lane. After changing the lane based on the prompt information, for example, changing to the straight lane, the vehicle may still use an original navigation path 1. As shown in FIG. 7b, the vehicle is not allowed to change the lane at a location of the vehicle. In this case, a yaw probability of the vehicle is high. In this case, the reminder information may be generated. The reminder information may be used to remind the user whether to change the navigation path based on a driving direction of the current lane. For example, as shown in FIG. 7b, a lane in which a current location A of the vehicle is located is the lane 1, and the navigation map module may plan a navigation path 2 based on the current location A, a turning rule (left turn) of the lane 1 corresponding to the current location A, and a destination Y. The navigation map module may use the planned path as a candidate path and store the path in the navigation map module, or may directly display the planned path on the user interface, to notify the user whether to change the navigation path. After receiving a navigation path switching instruction of the user, the navigation map module uses the candidate path as an updated navigation path, and displays the updated navigation path to the user. This avoids the user from violating a traffic law because the user continues driving according to an original navigation route without noticing that the current lane is a left turn lane, and improves navigation effect.

With reference to the accompanying drawings, the following describes apparatuses configured to implement the foregoing methods in the embodiments of this application.

Therefore, all the foregoing content may be used in the following embodiments. Repeated content is not described again.

Figure 8:
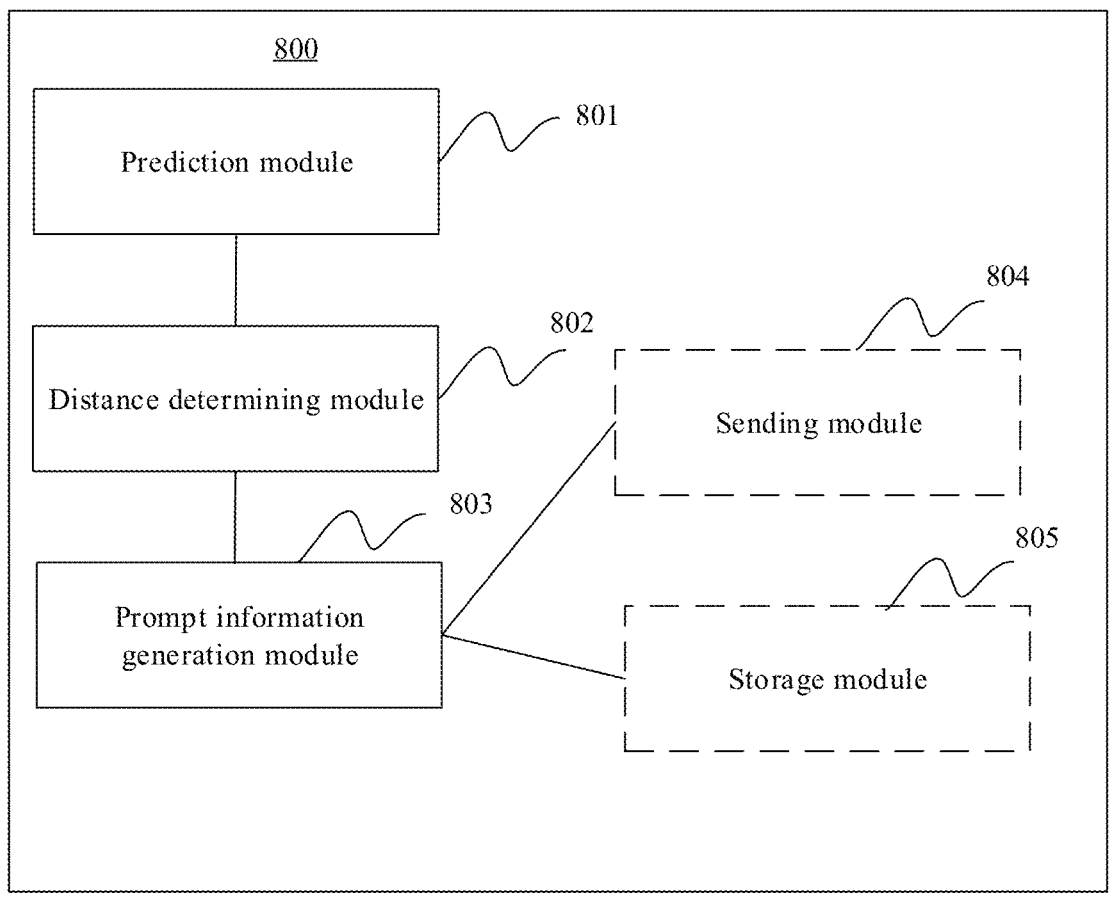
FIG. 8 is a schematic diagram of a structure of a first reminding apparatus in assisted driving according to an embodiment of this application.

FIG. 8 is a block diagram of a structure of an reminding apparatus in assisted driving 800 according to an embodiment of this application. For example, the reminding apparatus in assisted driving 800 may be a map server, a terminal device, a vehicle, or a vehicle-mounted apparatus. The reminding apparatus in assisted driving 800 includes a prediction module 801, a distance determining module 802, and a prompt information generation module 803. The prediction module 801, the distance determining module 802, and the prompt information generation module 803 may be apparatuses independent of each other. The prediction module 801 and the distance determining module 802 may be modules or units in a map server. The prompt information generation module 803 is a module or unit in the vehicle-mounted apparatus. The prediction module 801, the distance determining module 802, and the prompt information generation module 803 may communicate with each other in a wired manner or a wireless manner. Alternatively, the prediction module 801, the distance determining module 802, and the prompt information generation module 803 may be vehicle-mounted apparatuses located in the vehicle. The prediction module 801, the distance determining module 802, and the prompt information generation module 803 may communicate with each other in a wired manner or a wireless manner.

For example, the reminding apparatus in assisted driving 800 may be a vehicle-mounted apparatus, a chip applied to the vehicle-mounted apparatus, a combined component or part that has a map generation function and that are disposed in a terminal apparatus, or another combined component or part that has a reminding function in assisted driving. Alternatively, the reminding apparatus in assisted driving 800 may be a map server or a chip applied to the map server. When the reminding apparatus in assisted driving 800 is a component having functions of a terminal, the prediction module 801, the distance determining module 802, and the prompt information generation module 803 may be a processor, for example, a baseband processor. When the reminding apparatus in assisted driving 800 is a chip system, the prediction module 801, the distance determining module 802, and the prompt information generation module 803 may be processors of the chip system, and may include one or more central processing units. When the reminding apparatus in assisted driving 800 is a map server, the prediction module 801, the distance determining module 802, and the prompt information generation module 803 may be processors, for example, a baseband processor. The baseband processor may include one or more central processing units (CPU).

The reminding apparatus in assisted driving 800 may further include a sending module 804. When the reminding apparatus in assisted driving 800 is a part having functions of a terminal, the sending module 804 may be a radio frequency unit. When the reminding apparatus in assisted driving 800 is a chip system, the sending module 804 may be an input/output interface of the chip system (for example, a baseband chip). When the reminding apparatus in assisted driving 800 is a map server, the sending module 804 may be a transceiver, and may include an antenna, a radio frequency circuit, and the like. Alternatively, the sending module 804 may be an interface circuit coupled to the processor.

The prediction module 801, the distance determining module 802, and the prompt information generation module 803 may be configured to perform all operations other than receiving and sending operations performed by the reminding apparatus in assisted driving in the embodiment shown in FIG. 3, and/or configured to support another process of the technology described in this specification. The sending module 804 may be configured to perform all sending operations performed by the reminding apparatus in assisted driving in the embodiment shown in FIG. 3, and/or configured to support another process of the technology described in this specification.

In addition, the sending module 804 may be a function module. The function module may complete both a sending operation and a receiving operation. For example, if the sending module 804 is a module included in the reminding apparatus in assisted driving 800, the sending module 804 may be configured to perform all sending operations and receiving operations performed by the reminding apparatus in assisted driving in the embodiment shown in FIG. 3. For example, when performing the sending operation, the sending module 804 may be considered as a sending module, and when performing the receiving operation, the sending module 804 may be considered a receiving module. Alternatively, the sending module 804 may be a general term of two function modules. The two function modules are respectively a sending module and a receiving module. The sending module is configured to complete a sending operation. For example, if the sending module 804 is a module included in the vehicle, the sending module may be configured to perform all sending operations performed by the reminding apparatus in assisted driving in the embodiment shown in FIG. 3, and the receiving module is configured to complete the receiving operation. For example, if the sending module 804 is a module included in the vehicle, the receiving module may be configured to perform all receiving operations performed by the reminding apparatus in assisted driving in the embodiment shown in FIG. 3.

The prediction module 801 is configured to predict a target intersection based on map information, a positioning location of a vehicle, and a motion status of the vehicle, where the target intersection is an intersection that the vehicle is to first pass in the future.

The distance determining module 802 is configured to determine a distance between the vehicle and the target intersection based on the map information and the positioning location of the vehicle.

The prompt information generation module 803 is configured to: when the distance determining module determines that the distance between the vehicle and the target intersection is less than a first threshold, generate prompt information based on a turn light status of the vehicle and a first turning rule of a first lane in which the vehicle is located at the target intersection, where the prompt information prompts that the turn light status does not conform to the first turning rule.

In an embodiment, when the distance determining module 802 determines that the distance between the vehicle and the target intersection is less than the first threshold and greater than a second threshold, the prompt information is further used to prompt the vehicle to change from the first lane to a second lane, and the turn light status meets a second turning rule of the second lane at the target intersection, where the second threshold is less than the first threshold.

In an embodiment, when the distance determining module 802 determines that the distance between the vehicle and the target intersection is less than the second threshold, the prompt information is further used to prompt that the vehicle passes the target intersection from the first lane based on the first turning rule, where the second threshold is less than the first threshold.

In an embodiment, the first threshold is related to at least one of a solid line length of the first lane, a running speed of the vehicle, or a traffic congestion degree near the positioning location of the vehicle.

In an embodiment, the second threshold is related to at least one of a solid line length of the first lane, the running speed of the vehicle, or the traffic congestion degree near the positioning location of the vehicle.

In an embodiment, the apparatus further includes the sending module 804, where the sending module 804 is configured to report first information to a server. Alternatively, the apparatus further includes a storage module 805, configured to store the first information. The first information is generated based on the prompt information, and records a first lane at the target intersection as a turning violation-prone lane.

In an embodiment, the first information includes at least one of a first identifier of the vehicle or first identity information of a current driver of the vehicle.

Division into the modules in the embodiments of this application is an example, is only division into logical functions, and may be other division during actual implementation. In addition, functional modules in the embodiments of this application may be integrated into one processor, or each of the modules may exist alone physically, or two or more modules may be integrated into one module. The integrated unit may be implemented in a form of hardware, or may be implemented in a form of a software function unit.

Only one or more of the units in FIG. 8 may be implemented by software, hardware, firmware, or a combination thereof. The software or firmware includes but is not limited to computer program instructions or code, and may be executed by a hardware processor. The hardware includes but is not limited to various integrated circuits, such as a central processing unit (CPU), a digital signal processor (DSP), a field programmable gate array (FPGA), or an application-specific integrated circuit (ASIC).

Figure 9:
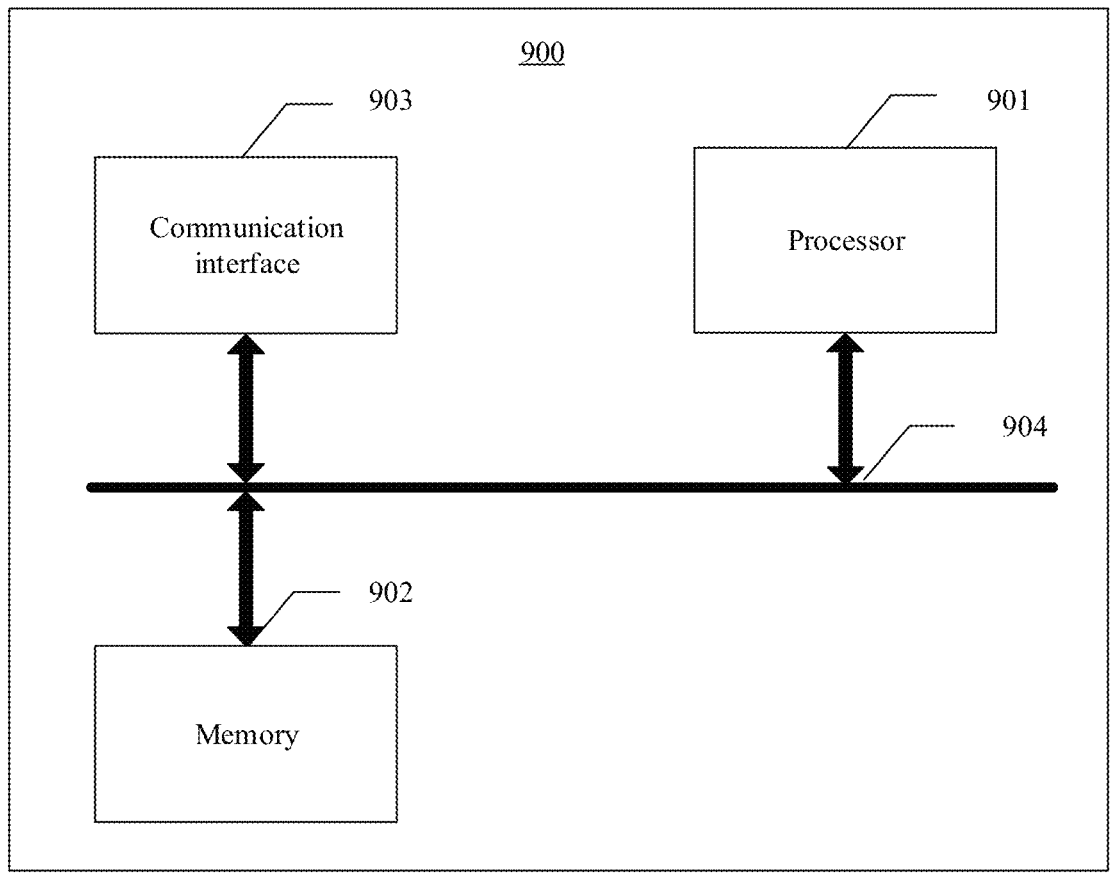
FIG. 9 is a schematic diagram of a structure of a second reminding apparatus in assisted driving according to an embodiment of this application.

FIG. 9 is a block diagram of a structure of an reminding apparatus in assisted driving 900 according to an embodiment of this application. The reminding apparatus in assisted driving 900 shown in FIG. 9 includes at least one processor 901. The reminding apparatus in assisted driving 900 further includes at least one memory 902, configured to store program instructions and/or data. The memory 902 is coupled to the processor 901. The coupling in this embodiment of this application may be an indirect coupling or a communication connection between apparatuses, units, or modules in an electrical form, a mechanical form, or another form, and is used for information exchange between the apparatuses, the units, or the modules. The processor 901 may cooperatively operate with the memory 902. The processor 901 may execute the program instructions stored in the memory 902. At least one of the at least one memory 902 may be included in the processor 901.

The reminding apparatus in assisted driving 900 may further include a communication interface 903, configured to communicate with another device by using a transmission medium, so that the reminding apparatus in assisted driving 900 may communicate with the another device. In the embodiments of this application, the communication interface may be a transceiver, a circuit, a bus, a module, or another type of communication interface. In this embodiment of this application, when the communication interface is a transceiver, the transceiver may include an independent receiver or an independent transmitter, or may include a transceiver integrating transceiver functions, an interface circuit, or the like.

It should be understood that a connection medium among the processor 901, the memory 902, and the communication interface 903 is not limited in this embodiment of this application. In this embodiment of this application, the memory 902, the processor 901, and the communication interface 903 are connected by using a communication bus 904 in FIG. 9. A bus is represented by a bold line in FIG. 9. A manner of connection between other components is only an example for description and is not limited. The bus may be classified into an address bus, a data bus, a control bus, and the like. For ease of representation, only one thick line represents the bus in FIG. 9, but this does not mean that there is only one bus or only one type of bus.

In an example, the reminding apparatus in assisted driving 900 is configured to implement the operations performed by the reminding apparatus in assisted driving in the procedure shown in FIG. 3. The reminding apparatus in assisted driving 900 may be a server, or a chip or a circuit in the server. The communication interface 903 is configured to perform operations related to receiving and sending of the reminding apparatus in assisted driving in the foregoing embodiment. The processor 901 is configured to perform processing-related operations of the reminding apparatus in assisted driving in the foregoing method embodiments.

For example, the processor 901 predicts a target intersection based on map information, a positioning location of a vehicle, and a motion status of the vehicle, where the target intersection is an intersection that the vehicle is to first pass in the future; determine a distance between the vehicle and the target intersection based on the map information and the positioning location of the vehicle; and when the distance determining module determines that the distance between the vehicle and the target intersection is less than a first threshold, generate prompt information based on a turn light status of the vehicle and a first turning rule of a first lane in which the vehicle is located at the target intersection, where the prompt information prompts that the turn light status does not conform to the first turning rule.

Figure 10:
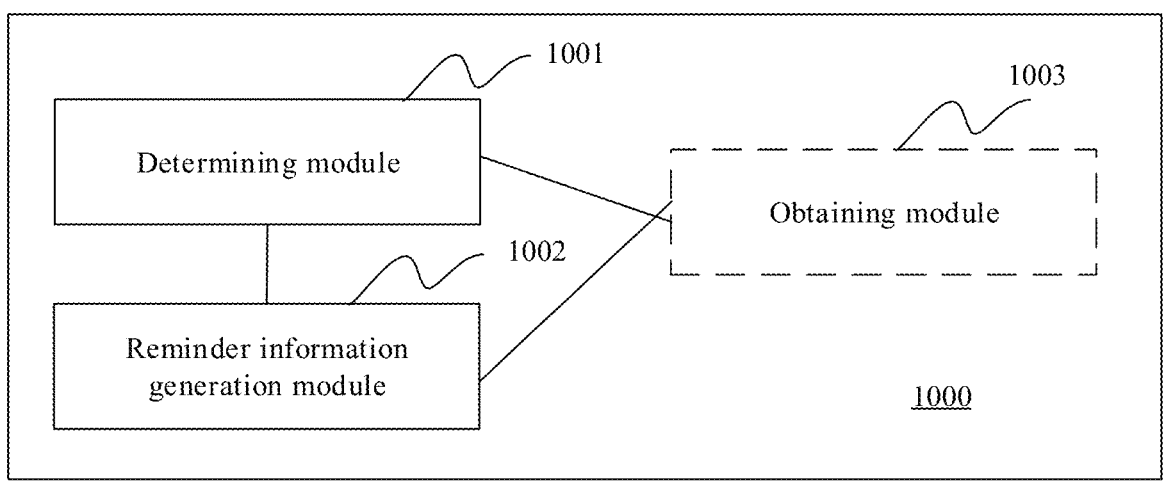
FIG. 10 is a schematic diagram of a structure of a first reminding apparatus in map-assisted driving according to an embodiment of this application.

FIG. 10 shows a reminding apparatus in map-assisted driving 1000 according to an embodiment of this application. The reminding apparatus in map-assisted driving 1000 may be a communication device or a communication apparatus that can support the communication device in implementing a function in the method, for example, a chip system. For example, the reminding apparatus in map-assisted driving 1000 may be a server, a terminal device, a vehicle, or a vehicle-mounted apparatus. The apparatus includes a determining module 1001, a reminder information generation module 1002, and an obtaining module 1003. The determining module 1001, the reminder information generation module 1002, and the obtaining module 1003 may be apparatuses independent of each other. For example, the determining module 1001 and the reminder information generation module 1002 may be modules or units in a map server, and the obtaining module 1003 may be a module or a determining module 1001 in a vehicle-mounted apparatus. The reminder information generation module 1002 and the obtaining module 1003 may communicate with each other in a wired manner or a wireless manner. Alternatively, the determining module 1001, the reminder information generation module 1002, and the obtaining module 1003 may be vehicle-mounted apparatuses located in a vehicle. The determining module 1001, the reminder information generation module 1002, and the obtaining module 1003 may communicate with each other in a wired manner or a wireless manner.

For example, the reminding apparatus in map-assisted driving 1000 may be a vehicle-mounted apparatus, a chip applied to the vehicle-mounted apparatus, a combined component or part that has a map generation function and that are disposed in a terminal apparatus, or another combined component or part that has a reminding function in assisted driving. Alternatively, the reminding apparatus in map-assisted driving 1000 may be a map server or a chip applied to a map server. When the reminding apparatus in map-assisted driving 1000 is a component having functions of a terminal, the determining module 1001 and the reminder information generation module 1002 may be a processor, for example, a baseband processor. When the reminding apparatus in map-assisted driving 1000 is a chip system, the determining module 1001 and the reminder information generation module 1002 may be processors of the chip system, and may include one or more central processing units. When the reminding apparatus in map-assisted driving 1000 is a map server, the determining module 1001 and the reminder information generation module 1002 may be processors, for example, a baseband processor. The baseband processor may include one or more central processing units.

The reminding apparatus in map-assisted driving 1000 may further include the obtaining module 1003. When the reminding apparatus in map-assisted driving 1000 is a component having a terminal function, the obtaining module 1003 may be a radio frequency unit. When the reminding apparatus in map-assisted driving 1000 is a chip system, the obtaining module 1003 may be an input/output interface of the chip system (for example, a baseband chip). When the reminding apparatus in map-assisted driving 1000 is a map server, the obtaining module 1003 may be a transceiver, and may include an antenna, a radio frequency circuit, and the like. Alternatively, the sending module 1003 may be an interface circuit coupled to the processor.

The determining module 1001 and the reminder information generation module 1002 may be configured to perform all operations other than sending and receiving operations performed by the reminding apparatus in map-assisted driving in the embodiment shown in FIG. 6, and/or configured to support another process of the technology described in this specification. The obtaining module 1003 may be configured to perform all sending operations performed by the reminding apparatus in map-assisted driving in the embodiment shown in FIG. 6, and/or configured to support another process of the technology described in this specification.

In addition, the obtaining module 1003 may be a function module. The function module may complete both a sending operation and a receiving operation. For example, if the obtaining module 1003 is a module included in the reminding apparatus in map-assisted driving 1000, the obtaining module 1003 may be configured to perform all sending operations and receiving operations performed by the reminding apparatus in map-assisted driving in the embodiment shown in FIG. 6. For example, when performing the sending operation, the obtaining module 1003 may be considered as a sending module, and when performing the receiving operation, the obtaining module 1003 may be considered as a receiving module. Alternatively, the obtaining module 1003 may be a general term of two function modules. The two function modules are respectively a sending module and a receiving module. The sending module is configured to complete a sending operation. For example, if the obtaining module 1003 is a module included in the vehicle, the sending module may be configured to perform all sending operations performed by the reminding apparatus in map-assisted driving in the embodiment shown in FIG. 6, and the receiving module is configured to complete the receiving operation. For example, if the obtaining module 1003 is a module included in the vehicle, the receiving module may be configured to perform all receiving operations performed by the reminding apparatus in map-assisted driving in the embodiment shown in FIG. 6.

The determining module 1001 is configured to: determine, based on a driving path planning result, that a vehicle is to pass a target intersection in a first direction, and determine, based on a map including first information in this embodiment of this application, a first lane in which the vehicle passes the target intersection in the first direction. The first lane is one of at least one turning violation-prone lane recorded in the first information on the map. The reminder information generation module 1002 is configured to generate reminder information. The reminder information reminds a driver that a first lane in which the vehicle is to pass in the future based on a planned driving route is a turning violation-prone lane.

In an embodiment, the first information further includes identity information of a historical user that has a turning violation risk when the vehicle passes the target intersection from the first lane, and the identity information of the historical user includes at least one of a first identifier or first identity information. The obtaining module 1003 is configured to obtain identity information of a current user. The identity information of the current user includes at least one of the identifier of the vehicle or identity information of a current driver of the vehicle. The reminder information generation module 1002 is configured to generate the reminder information based on a result of consistency comparison between the identity information of the current user and the identity information of the historical user.

Figure 11:
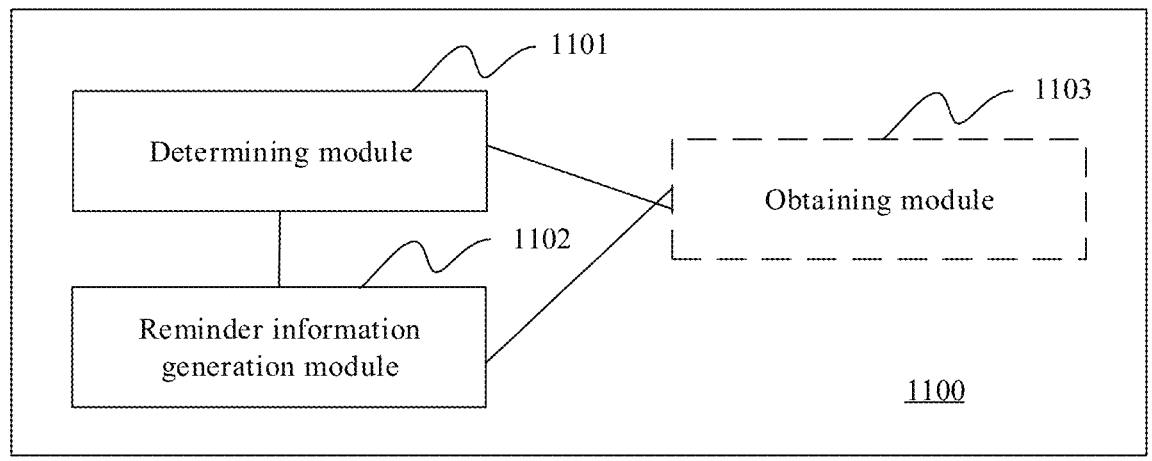
FIG. 11 is a schematic diagram of a structure of a second reminding apparatus in map-assisted driving according to an embodiment of this application.

FIG. 11 shows a reminding apparatus in map-assisted driving 1100 according to an embodiment of this application. The reminding apparatus in map-assisted driving 1100 may be a communication device or a communication apparatus that can support the communication device in implementing a function in the method, for example, a chip system. For example, the reminding apparatus in map-assisted driving may be a server, a terminal device, a vehicle, or a vehicle-mounted apparatus. The apparatus includes a determining module 1101 and a reminder information generation module 1102. The apparatus may further include an obtaining module 1103. The determining module 1101, the reminder information generation module 1102, and the obtaining module 1103 may be apparatuses independent of each other. For example, the determining module 1101 and the reminder information generation module 1102 may be modules or units in a map server, and the obtaining module 1103 may be a module or the determining module 1101 in the vehicle-mounted apparatus. The reminder information generation module 1102 and the obtaining module 1103 may communicate with each other in a wired manner or a wireless manner. Alternatively, the determining module 1101, the reminder information generation module 1102, and the obtaining module 1103 may be vehicle-mounted apparatuses located in the vehicle. The determining module 1101, the reminder information generation module 1102, and the obtaining module 1103 may communicate with each other in a wired manner or a wireless manner.

For example, the reminding apparatus in map-assisted driving 1100 may be a vehicle-mounted apparatus, a chip applied to the vehicle-mounted apparatus, a combined component or part that has a map generation function and that are disposed in a terminal apparatus, or another combined component or part that has a reminding function in assisted driving. Alternatively, the reminding apparatus in map-assisted driving 1100 may be a map server or a chip applied to a map server. When the reminding apparatus in map-assisted driving 1100 is a component having functions of a terminal, the determining module 1101 and the reminder information generation module 1102 may be a processor, for example, a baseband processor. When the reminding apparatus in map-assisted driving 1100 is a chip system, the determining module 1101 and the reminder information generation module 1102 may be processors of the chip system, and may include one or more central processing units. When the reminding apparatus in map-assisted driving 1100 is a map server, the determining module 1101 and the reminder information generation module 1102 may be processors, for example, a baseband processor. The baseband processor may include one or more central processing units.

The reminding apparatus in map-assisted driving 1100 may further include an obtaining module 1103. When the reminding apparatus in map-assisted driving 1100 is a component having a terminal function, the obtaining module 1103 may be a radio frequency unit. When the reminding apparatus in map-assisted driving 1100 is a chip system, the obtaining module 1103 may be an input/output interface of the chip system (for example, a baseband chip). When the reminding apparatus in map-assisted driving 1100 is a map server, the obtaining module 1103 may be a transceiver, and may include an antenna, a radio frequency circuit, and the like. Alternatively, the sending module 1103 may be an interface circuit coupled to the processor.

The determining module 1101 and the reminder information generation module 1102 may be configured to perform all operations other than sending and receiving operations performed by the reminding apparatus in map-assisted driving in the embodiment shown in FIG. 6, and/or configured to support another process of the technology described in this specification. The obtaining module 1103 may be configured to perform all sending operations performed by the reminding apparatus in map-assisted driving in the embodiment shown in FIG. 6, and/or configured to support another process of the technology described in this specification.

In addition, the obtaining module 1103 may be a function module. The function module may complete both a sending operation and a receiving operation. For example, if the obtaining module 1103 is a module included in the reminding apparatus in map-assisted driving 1100, the obtaining module 1103 may be configured to perform all sending operations and receiving operations performed by the reminding apparatus in map-assisted driving in the embodiment shown in FIG. 6. For example, when performing the sending operation, the obtaining module 1103 may be considered as a sending module, and when performing the receiving operation, the obtaining module 1103 may be considered as a receiving module. Alternatively, the obtaining module 1103 may be a general term of two function modules. The two function modules are respectively a sending module and a receiving module. The sending module is configured to complete a sending operation. For example, if the obtaining module 1103 is a module included in the vehicle, the sending module may be configured to perform all sending operations performed by the reminding apparatus in map-assisted driving in the embodiment shown in FIG. 6, and the receiving module is configured to complete the receiving operation. For example, if the obtaining module 1103 is a module included in the vehicle, the receiving module may be configured to perform all receiving operations performed by the reminding apparatus in map-assisted driving in the embodiment shown in FIG. 6.

The determining module 1101 is configured to determine, based on a driving path planning result, that a vehicle is to pass a target intersection in a first direction, and determine, based on a map, a first lane in which the vehicle passes the target intersection in the first direction. The first lane is one of at least one turning violation-prone lane recorded in first information on the map. The map includes first information. The first information is generated based on prompt information, and records the first lane at the target intersection as a turning violation-prone lane. The prompt information prompts that a turn light status of the vehicle does not conform to a first turning rule of a first lane in which the vehicle is located.

The reminder information generation module 1102 is configured to generate reminder information, where the reminder information reminds a driver that a first lane in which the vehicle is to pass in the future based on a planned driving route is a turning violation-prone lane.

In an embodiment, when a distance between the vehicle and the target intersection is less than a first threshold, the prompt information is generated based on the turn light status of the vehicle and a first turning rule of the target intersection. The target intersection is a target intersection predicted based on map information, a positioning location of a vehicle, and a motion status of the vehicle. The target intersection is an intersection that the vehicle is to first pass in the future. The distance between the vehicle and the target intersection is determined based on the map information and the positioning location of the vehicle.

In an embodiment, the first information includes at least one of a first identifier of the vehicle or first identity information of a current driver of the vehicle.

In an embodiment, the first information may be information reported by the vehicle to the server, or the first information may be information stored by the vehicle.

In an embodiment, when the distance between the vehicle and the target intersection is less than the first threshold and greater than a second threshold, the prompt information is further used to prompt the vehicle to change from the first lane to a second lane, and the turn light status meets a second turning rule of the second lane at the target intersection, where the second threshold is less than the first threshold.

In an embodiment, when the distance between the vehicle and the target intersection is less than the second threshold, the prompt information is further used to prompt that the vehicle passes the target intersection from the first lane based on the first turning rule, where the second threshold is less than the first threshold.

In an embodiment, the first threshold is related to at least one of a solid line length of the first lane, a running speed of the vehicle, or a traffic congestion degree near the positioning location of the vehicle.

In an embodiment, the second threshold is related to at least one of a solid line length of the first lane, the running speed of the vehicle, or the traffic congestion degree near the positioning location of the vehicle.

In an embodiment, the first information further includes identity information of a historical user that has a turning violation risk when the vehicle passes the target intersection from the first lane, and the identity information of the historical user includes at least one of a first identifier or first identity information. The obtaining module 1103 is configured to obtain identity information of a current user. The identity information of the current user includes at least one of the identifier of the vehicle or identity information of the current driver of the vehicle. The reminder information generation module 1102 is configured to generate the reminder information based on a result of consistency comparison between the identity information of the current user and the identity information of the historical user.

Figure 12:
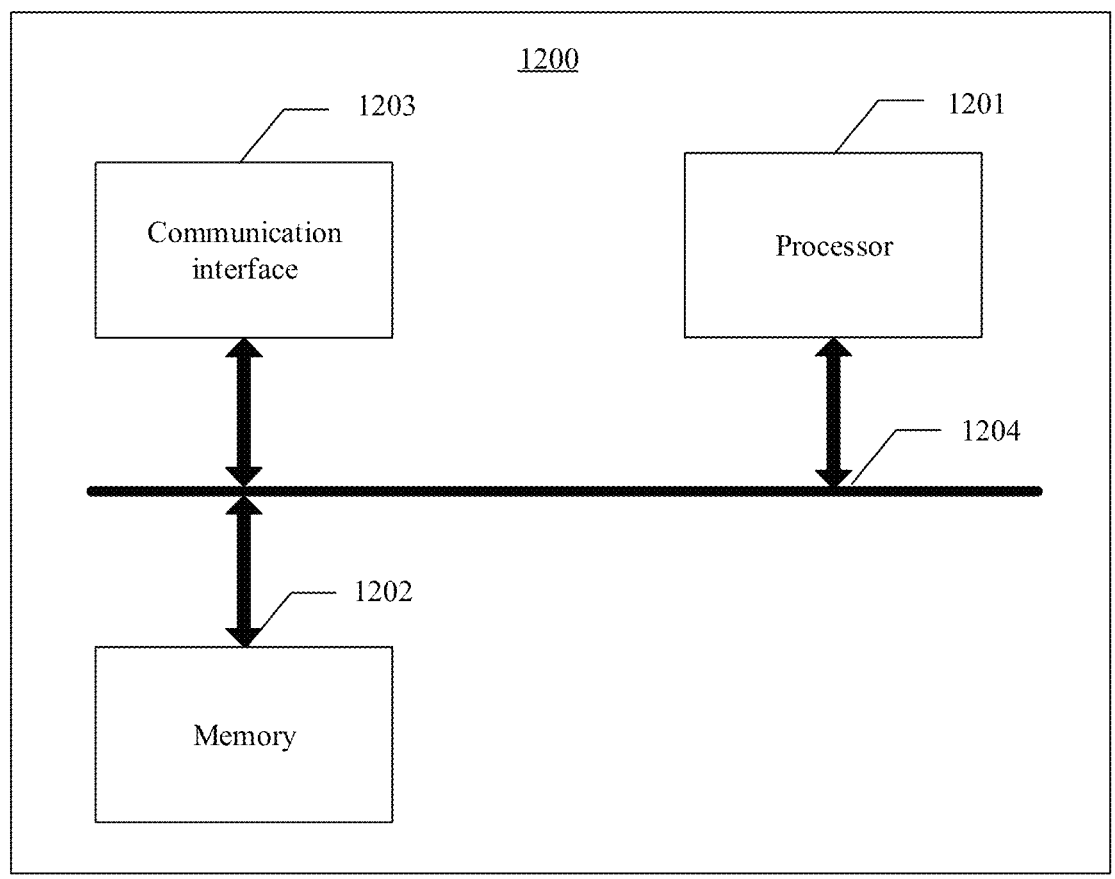
FIG. 12 is a schematic diagram of a structure of a third reminding apparatus in map-assisted driving according to an embodiment of this application.

A reminding apparatus in map-assisted driving 1200 shown in FIG. 12 includes at least one processor 1201. The reminding apparatus in map-assisted driving 1200 further includes at least one memory 1202, configured to store program instructions and/or data. The memory 1202 is coupled to the processor 1201. The coupling in this embodiment of this application may be an indirect coupling or a communication connection between apparatuses, units, or modules in an electrical form, a mechanical form, or another form, and is used for information exchange between the apparatuses, the units, or the modules. The processor 1201 may cooperatively operate with the memory 1202. The processor 1201 may execute the program instructions stored in the memory 1202. At least one of the at least one memory 1202 may be included in the processor 1201.

The reminding apparatus in map-assisted driving 1200 may further include a communication interface 1203, configured to communicate with another device by using a transmission medium, so that the reminding apparatus in map-assisted driving 1200 may communicate with the another device. In the embodiments of this application, the communication interface may be a transceiver, a circuit, a bus, a module, or another type of communication interface. In this embodiment of this application, when the communication interface is a transceiver, the transceiver may include an independent receiver or an independent transmitter, or may include a transceiver integrating transceiver functions, an interface circuit, or the like.

It should be understood that a connection medium among the processor 1201, the memory 1202, and the communication interface 1203 is not limited in this embodiment of this application. In this embodiment of this application, the memory 1202, the processor 1201, and the communication interface 1203 are connected by using a communication bus 1204 in FIG. 12. The bus is represented by a bold line in FIG. 12. A manner of connection between other components is only an example for description and is not limited. The bus may be classified into an address bus, a data bus, a control bus, and the like. For ease of representation, only one thick line represents the bus in FIG. 12, but this does not mean that there is only one bus or only one type of bus.

In an example, the reminding apparatus in map-assisted driving 1200 is configured to implement the operations performed by the reminding apparatus in map-assisted driving in the procedure shown in FIG. 6. The reminding apparatus in map-assisted driving 1200 may be a terminal, or a chip or a circuit in the terminal. Alternatively, the reminding apparatus in map-assisted driving 1200 may be a server or a chip in the server. The communication interface 1203 is configured to perform operations related to receiving and sending of the reminding apparatus in map-assisted driving in the foregoing embodiment. The processor 1201 is configured to perform processing-related operations of the reminding apparatus in map-assisted driving in the foregoing method embodiments.

For example, the processor 1201 is configured to: determine, based on a driving path planning result, that a vehicle is to pass a target intersection in a first direction; determine, based on a map including first information in this embodiment of this application, a first lane in which the vehicle passes the target intersection in the first direction, where the first lane is one of at least one turning violation-prone lane recorded in the first information on the map; and generate reminder information, where the reminder information reminds a driver that a first lane in which the vehicle is to pass in the future based on a planned driving route is a turning violation-prone lane.

Alternatively, the processor 1201 is configured to: determine, based on a driving path planning result, that a vehicle is to pass the target intersection in a first direction; determine, based on a map, a first lane in which the vehicle passes the target intersection in the first direction, where the first lane is one of at least one turning violation-prone lane recorded in the first information on the map, the map includes first information, the first information is generated based on the prompt information, and records the first lane at the target intersection as a turning violation-prone lane, and the prompt information prompts that the turn light status of the vehicle does not conform to the first turning rule of the first lane in which the vehicle is located; and generate reminder information, where the reminder information reminds a driver that a first lane in which the vehicle is to pass in the future based on a planned driving route is a turning violation-prone lane.

This application provides a computer-readable storage medium, including computer instructions. When the computer instructions are run by a processor, the reminding apparatus in assisted driving is enabled to perform the reminding method in assisted driving in the embodiments of this application.

This application provides a computer-readable storage medium, including computer instructions. When the computer instructions are run by a processor, the reminding apparatus in map-assisted driving is enabled to perform the reminding method in assisted driving in the embodiments of this application.

This application provides a computer program product. When the computer program product runs on a processor, the reminding apparatus in assisted driving is enabled to perform the reminding method in assisted driving in the embodiments of this application.

This application provides a computer program product. When the computer program product runs on a processor, the reminding apparatus in map-assisted driving is enabled to perform the reminding method in map-assisted driving in the embodiments of this application.

This application provides a communication system. The communication system includes the reminding apparatus in assisted driving 800 in FIG. 8 or the reminding apparatus in assisted driving 900 in FIG. 9. The communication system further includes the reminding apparatus in map-assisted driving 1000 described in FIG. 10, the reminding apparatus in map-assisted driving 1100 described in FIG. 11, or the reminding apparatus in map-assisted driving 1200 described in FIG. 12.

An embodiment of this application further provides a computer storage medium. The computer-readable storage medium stores instructions. When the instructions run on a processor, a positioning apparatus is enabled to perform the method in any of the foregoing embodiments.

An embodiment of this application further provides a computer program product including instructions. The computer program product stores the instructions, and when the instructions run on a processor, a positioning apparatus is enabled to perform the method in any of the foregoing embodiments.

In the embodiments of this application, the processor may be a general-purpose processor, a digital signal processor, an application-specific integrated circuit, a field programmable gate array or another programmable logic device, a discrete gate or transistor logic device, or a discrete hardware component, and may implement or perform the methods, operations, and logical block diagrams disclosed in embodiments of this application. The general-purpose processor may be a microprocessor, or may be any conventional processor or the like. The operations of the method disclosed with reference to the embodiments of this application may be directly performed by a hardware processor, or may be performed by a combination of hardware and software modules in the processor.

In the embodiments of this application, the memory may be a nonvolatile memory, for example, a hard disk drive (HDD) or a solid-state drive (SSD), or may be a volatile memory, for example, a random-access memory (RAM). The memory is any other medium that can carry or store expected program code in a form of an instruction structure or a data structure and that can be accessed by a computer, but is not limited thereto. The memory in this embodiment of this application may alternatively be a circuit or any other apparatus that can implement a storage function, and is configured to store the program instructions and/or data.

All or some of the methods in the embodiments of this application may be implemented by using software, hardware, firmware, or any combination thereof. When software implements the embodiments, all or a part of the embodiments may be implemented in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, the SSD), or the like.

It is clear that a person skilled in the art can make various modifications and variations to this application without departing from the scope of this application. This application is intended to cover these modifications and variations of this application provided that they fall within the scope of protection defined by the following claims and their equivalent technologies.

In the embodiments of this application, "at least one" means one or more, and "a plurality of" means two or more. The term and/or describes an association relationship for describing associated objects and represents that three relationships may exist. For example, A and/or B may represent the following cases: Only A exists, both A and B exist, and only B exists, where A and B may be singular or plural. The character "/" usually indicates an "or" relationship between associated objects. "At least one of the following items (pieces)" or a similar expression thereof refers to any combination of these items, including any combination of singular items (pieces) or plural items (pieces). For example, at least one (piece) of a, b, or c may indicate: a, b, c, a and b, a and c, b and c, or a, b and c, where a, b, and c may be singular or plural.

A person skilled in the art should understand that the embodiments of this application may be provided as a method, a system, or a computer program product. Therefore, this application may use a form of a hardware-only embodiment, a software-only embodiment, or an embodiment with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application.

It should be understood that computer program instructions may be used to implement each process and/or each block in the flowcharts and/or the block diagrams and a combination of a process and/or a block in the flowcharts and/or the block diagrams. The computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more procedures in the flowcharts and/or in one or more blocks in the block diagrams.

The computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

The computer program instructions may alternatively be loaded onto a computer or another programmable data processing device, so that a series of operations are performed on the computer or the another programmable device, so that computer-implemented processing is generated. Therefore, the instructions executed on the computer or the another programmable device provide operations for implementing a specific function in one or more procedures in the flowcharts and/or in one or more blocks in the block diagrams.

In the several embodiments provided in this application, it should be understood that the disclosed apparatus and method may be implemented in other manners. For example, the described mobile device embodiment is only an example. For example, the module or division into the units is only logical function division and may be other division in actual implementation. For example, a plurality of units or components may be combined or integrated into another system, or some features may be ignored or not performed. The units described as separate parts may or may not be physically separate, and parts displayed as units may or may not be physical units, may be located in one position, or may be distributed on a plurality of network units. Some or all the modules may be selected based on an actual requirement to achieve the objectives of the solutions of the embodiments. A person of ordinary skill in the art may understand and implement the embodiments without creative efforts.

In addition, the described apparatuses, methods, and schematic diagrams of different embodiments may be combined or integrated with other systems, modules, technologies, or methods without departing from the scope of this application. In addition, the displayed or discussed mutual couplings or direct couplings or communication connections may be implemented by using some interfaces. The indirect couplings or communication connections between the apparatuses or units may be implemented in electronic, mechanical, or other forms.

The foregoing descriptions are only specific embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A apparatus for assisted driving of a vehicle, comprising:
   at least one processor; and
   at least one memory storing program instructions and coupled to the at least one processor, wherein the program instructions, when executed by the at least one processor, cause the apparatus to:
   predict a target intersection based on map information, a positioning location of the vehicle, and a motion status of the vehicle, wherein the target intersection is an intersection that the vehicle is to first pass in the future;
   determine a distance between the vehicle and the target intersection based on the map information and the positioning location of the vehicle; and
   generate prompt information based on a turn light status of the vehicle and a first turning rule of a first lane in which the vehicle is located at the target intersection, when the distance between the vehicle and the target intersection is less than a first threshold, wherein the prompt information prompts that the turn light status does not conform to the first turning rule.

2. The apparatus according to claim 1, wherein when the distance between the vehicle and the target intersection is less than the first threshold and greater than a second threshold, the prompt information prompts the vehicle to change from the first lane to a second lane, wherein the turn light status meets a second turning rule of the second lane at the target intersection, and wherein the second threshold is less than the first threshold.

3. The apparatus according to claim 2, wherein
   when the distance between the vehicle and the target intersection is less than the second threshold, the prompt information prompts that the vehicle passes the target intersection from the first lane based on the first turning rule, wherein the second threshold is less than the first threshold.

4. The apparatus according to claim 3, wherein the first threshold is related to at least one of a solid line length of the first lane, a running speed of the vehicle, or a traffic congestion degree near the positioning location of the vehicle.

5. The apparatus according to claim 4, wherein the second threshold is related to at least one of the solid line length of the first lane, the running speed of the vehicle, or the traffic congestion degree near the positioning location of the vehicle.

6. The apparatus according to claim 1, wherein the program instructions further cause the apparatus to:
   report first information to a server recording the first lane at the target intersection as a turning violation-prone lane.

7. The apparatus according to claim 6, wherein the first information comprises at least one of a first identifier of the vehicle or first identity information of a current driver of the vehicle.

8. The apparatus according to claim 1, wherein the program instructions further cause the apparatus to:
   store first information recording the first lane at the target intersection as a turning violation-prone lane.

9. The apparatus according to claim 8, wherein the first information comprises at least one of a first identifier of the vehicle or first identity information of a current driver of the vehicle.

10. The apparatus according to claim 1, wherein the map information is from a map, which further comprises first information, wherein the first information records at least one lane of at least one target intersection as a turning violation-prone lane.

11. The apparatus according to claim 10, wherein the first information is information customized for one user, or information common to a plurality of users.

12. The apparatus according to claim 11, wherein the first information comprises an identifier of the one user or identifiers of the plurality of users, and the identifier of the one user or the identifiers of the plurality of users comprise at least one of an identifier of a vehicle or identity information of a driver of the vehicle.

13. A apparatus for assisted driving of a vehicle, comprising:
    at least one processor; and
    at least one memory, wherein the at least one memory stores program instructions and coupled to the at least one processor, wherein the program instructions, when executed by the at least one processor, cause apparatus to:
    determine, based on a driving path planning result, that a vehicle is to pass a target intersection in a first direction;
    determine, based on a map, a first lane in which the vehicle passes the target intersection in the first direction, wherein the map records at least one lane of at least one target intersection as a turning violation-prone lane, and the first lane is one of at least one turning violation-prone lane recorded in first information on the map; and
    generate reminder information, wherein the reminder information reminds a driver that the first lane in which the vehicle is to pass in the future based on a planned driving route is a turning violation-prone lane.

14. The apparatus according to claim 13, wherein the first information further comprises identity information of a historical user that has a turning violation risk when the vehicle passes the target intersection from the first lane, and the identity information of the historical user comprises at least one of an identifier of the vehicle or identity information of the driver of the vehicle;
    wherein the program instructions further cause the apparatus to:
    obtain identity information of a current user, wherein the identity information of the current user comprises at least one of the identifier of the vehicle or identity information of a current driver of the vehicle; and generate the reminder information based on a result of consistency comparison between the identity information of the current user and the identity information of the historical user.

15. A method of assisted driving of a vehicle, comprising:
predicting a target intersection based on map information, a positioning location of the vehicle, and a motion status of the vehicle, wherein the target intersection is an intersection that the vehicle is to first pass in the future;

determining a distance between the vehicle and the target intersection based on the map information and the positioning location of the vehicle; and generating prompt information based on a turn light status of the vehicle and a first turning rule of a first lane in which the vehicle is located at the target intersection, when the distance between the vehicle and the target intersection is less than a first threshold, wherein the prompt information prompts that the turn light status does not conform to the first turning rule.

16. The apparatus according to claim 15, wherein when the distance between the vehicle and the target intersection is less than the first threshold and greater than a second threshold, the prompt information prompts the vehicle to change from the first lane to a second lane, wherein the turn light status meets a second turning rule of the second lane at the target intersection, and wherein the second threshold is less than the first threshold.

17. The method according to claim 16, wherein
when the distance between the vehicle and the target intersection is less than the second threshold, the prompt information prompts that the vehicle passes the target intersection from the first lane based on the first turning rule, wherein the second threshold is less than the first threshold.

18. The method according to claim 16, wherein the first threshold is related to at least one of a solid line length of the first lane, a running speed of the vehicle, or a traffic congestion degree near the positioning location of the vehicle.

19. The method according to claim 18, wherein the second threshold is related to at least one of the solid line length of the first lane, the running speed of the vehicle, or the traffic congestion degree near the positioning location of the vehicle.

20. The method according to claim 15, wherein the program instructions further cause the apparatus to:
report first information to a server recording the first lane at the target intersection as a turning violation-prone lane.

* * * * *